US007392249B1

(12) United States Patent
Harris et al.

(10) Patent No.: US 7,392,249 B1
(45) Date of Patent: Jun. 24, 2008

(54) METHODS, SYSTEMS, AND COMPUTER-READABLE MEDIUMS FOR PROVIDING PERSISTING AND CONTINUOUSLY UPDATING SEARCH FOLDERS

(75) Inventors: Jensen M. Harris, Kirkland, WA (US); Richard Hank Leukart, Seattle, WA (US); Jiaxin (Jesse) Wang, Redmond, WA (US); Jesse Clay Satterfield, Seattle, WA (US); Julia Cai, Issaquah, WA (US); Jason V. Morse, Bellevue, WA (US)

(73) Assignee: Microsoft Corporation, Seattle, WA (US)

( * ) Notice: Subject to any disclaimer, the term of this patent is extended or adjusted under 35 U.S.C. 154(b) by 494 days.

(21) Appl. No.: 10/741,407

(22) Filed: Dec. 19, 2003

Related U.S. Application Data

(60) Provisional application No. 60/484,437, filed on Jul. 1, 2003.

(51) Int. Cl.
*G06F 7/00* (2006.01)
*G06F 17/00* (2006.01)
(52) U.S. Cl. .................. 707/5; 707/2; 707/3; 707/4
(58) Field of Classification Search .................. 707/3, 707/4, 5, 102, 2; 715/500
See application file for complete search history.

(56) References Cited

U.S. PATENT DOCUMENTS 5,155,806 A   10/1992   Hoeber et al. .............. 715/711
5,500,936 A   3/1996   Allen et al. .................. 395/156
5,519,606 A   5/1996   Nielsen et al. .................. 705/9
5,559,944 A   9/1996   Ono .......................... 715/841
5,570,109 A   10/1996   Jenson ....................... 715/823
5,625,783 A   4/1997   Ezekiel et al. .............. 395/352
5,634,100 A   5/1997   Capps .......................... 705/9

(Continued)

FOREIGN PATENT DOCUMENTS

EP      1 223 503      7/2002

(Continued)

OTHER PUBLICATIONS

Goldberg et al., "Using Collaborative Filtering to Weave an Information Tapestry" Communication of the ACM, vol. 35, No. 12, pp. 61-70, Dec. 1992.*

(Continued)

*Primary Examiner*—Christian Chace
*Assistant Examiner*—Michael J. Hicks
(74) *Attorney, Agent, or Firm*—Merchant & Gould

(57) ABSTRACT

Providing persisting search folders within a computer that continuously identify data items having metadata matching a query of search criteria. A query of search criteria formulated via a graphical user interface is applied to a search filter to create a search folder. When the search folder is made live, the search filter is used to search one or more data stores for data items having metadata matching the query of search criteria. Upon finding these data items, the search folder is populated with a link to each data item having metadata matching the query of search criteria. The search folder detects when any new data items are added to a data store and when a change occurs to any metadata of data items previously stored in a data store. Upon detection, the search folders store links to matching new or changed data items.

28 Claims, 14 Drawing Sheets

U.S. PATENT DOCUMENTS

| | | | | |
|---|---|---|---|---|
| 5,634,128 | A | 5/1997 | Messina | 710/200 |
| 5,734,915 | A | 3/1998 | Roewer | 395/773 |
| 5,760,768 | A | 6/1998 | Gram | 345/333 |
| 5,760,773 | A | 6/1998 | Berman et al. | 715/808 |
| 5,761,646 | A | 6/1998 | Frid-Nielsen et al. | 705/9 |
| 5,778,404 | A | 7/1998 | Capps et al. | 715/531 |
| 5,805,167 | A | 9/1998 | Van Cruyningen | 715/808 |
| 5,828,376 | A | 10/1998 | Solimene et al. | 715/821 |
| 5,838,321 | A | 11/1998 | Wolf | 345/343 |
| 5,842,009 | A | 11/1998 | Borovoy et al. | 707/1 |
| 5,855,006 | A | 12/1998 | Huemoeller et al. | 705/9 |
| 5,898,436 | A | 4/1999 | Stewart et al. | 345/354 |
| 5,899,979 | A | 5/1999 | Miller et al. | 705/9 |
| 5,926,806 | A | 7/1999 | Marshall et al. | 707/3 |
| 5,940,078 | A | 8/1999 | Nagarajayya et al. | 345/346 |
| 5,943,051 | A | 8/1999 | Onda et al. | 715/786 |
| 5,960,406 | A | 9/1999 | Rasansky et al. | 705/9 |
| 5,970,466 | A | 10/1999 | Detjen et al. | 705/8 |
| 5,999,938 | A | 12/1999 | Bliss et al. | 707/102 |
| 6,008,806 | A | 12/1999 | Nakajima et al. | 345/335 |
| 6,018,343 | A | 1/2000 | Wang et al. | 345/356 |
| 6,034,683 | A | 3/2000 | Mansour et al. | 715/764 |
| 6,133,915 | A | 10/2000 | Arcuri et al. | 715/779 |
| 6,175,363 | B1 | 1/2001 | Williams et al. | 345/334 |
| 6,278,450 | B1 | 8/2001 | Arcuri et al. | 345/334 |
| 6,373,507 | B1 | 4/2002 | Camara et al. | 345/825 |
| 6,384,849 | B1 | 5/2002 | Morcos et al. | 715/810 |
| 6,429,882 | B1 | 8/2002 | Abdelnur et al. | 345/763 |
| 6,433,801 | B1 | 8/2002 | Moon et al. | 345/840 |
| 6,456,304 | B1 | 9/2002 | Angiulo et al. | 345/779 |
| 6,459,441 | B1 | 10/2002 | Perroux et al. | 345/837 |
| 6,466,236 | B1 | 10/2002 | Pivowar et al. | 715/835 |
| 6,469,722 | B1 | 10/2002 | Kinoe et al. | 345/837 |
| 6,480,865 | B1 | 11/2002 | Lee et al. | 715/523 |
| 6,493,006 | B1 | 12/2002 | Gourdol et al. | 715/825 |
| 6,570,596 | B2 | 5/2003 | Frederiksen | 715/808 |
| 6,578,192 | B1 | 6/2003 | Boehme et al. | 717/115 |
| 6,618,732 | B1 | 9/2003 | White et al. | 707/103 |
| 6,621,504 | B1 | 9/2003 | Nadas et al. | 715/723 |
| 6,621,508 | B1 | 9/2003 | Shiraishi et al. | 715/810 |
| 6,635,089 | B1 | 10/2003 | Burkett et al. | 715/513 |
| 6,680,749 | B1 | 1/2004 | Anderson et al. | 348/231.99 |
| 6,686,938 | B1 | 2/2004 | Jobs et al. | 345/835 |
| 6,727,919 | B1 | 4/2004 | Reder et al. | 715/810 |
| 6,732,330 | B1 | 5/2004 | Claussen et al. | 715/513 |
| 6,750,890 | B1 | 6/2004 | Sugimoto | 715/838 |
| 6,785,868 | B1 | 8/2004 | Raff | 715/530 |
| 6,826,729 | B1 | 11/2004 | Giesen et al. | 715/837 |
| 6,871,195 | B2 | 3/2005 | Ryan et al. | 706/46 |
| 6,904,449 | B1 | 6/2005 | Quinones | 709/203 |
| 6,915,492 | B2 | 7/2005 | Kurtenbach et al. | 715/810 |
| 6,924,797 | B1 | 8/2005 | MacPhail | 345/326 |
| 6,964,025 | B2 | 11/2005 | Angiulo et al. | 715/838 |
| 6,988,241 | B1 | 1/2006 | Guttman et al. | 715/503 |
| 6,990,637 | B2 | 1/2006 | Anthony et al. | 715/851 |
| 7,032,210 | B2 | 4/2006 | Alloing et al. | 712/106 |
| 7,039,596 | B1 | 5/2006 | Lu | 705/8 |
| 7,110,936 | B2 | 9/2006 | Hiew et al. | 703/22 |
| 7,152,207 | B1 | 12/2006 | Underwood et al. | 715/526 |
| 7,188,073 | B1 | 3/2007 | Tam et al. | 705/9 |
| 2002/0007380 | A1 | 1/2002 | Bauchot et al. | 707/530 |
| 2002/0070977 | A1 | 6/2002 | Morcos et al. | 345/810 |
| 2002/0078143 | A1 | 6/2002 | DeBoor et al. | |
| 2002/0091739 | A1 | 7/2002 | Ferlitsch | 707/526 |
| 2002/0122071 | A1 | 9/2002 | Camara et al. | |
| 2002/0135621 | A1 | 9/2002 | Angiulo et al. | 345/838 |
| 2002/0140731 | A1 | 10/2002 | Subramaniam et al. | 345/762 |
| 2002/0140740 | A1 | 10/2002 | Chen | |
| 2002/0149623 | A1 | 10/2002 | West et al. | 345/765 |
| 2002/0175955 | A1 | 11/2002 | Gourdol et al. | 345/821 |
| 2002/0196293 | A1 | 12/2002 | Suppan et al. | 345/853 |
| 2003/0009455 | A1* | 1/2003 | Carlson et al. | 707/6 |
| 2003/0011638 | A1 | 1/2003 | Chung | 345/808 |
| 2003/0035917 | A1 | 2/2003 | Hyman | 428/67 |
| 2003/0038832 | A1 | 2/2003 | Sobol | |
| 2003/0043211 | A1 | 3/2003 | Kremer et al. | |
| 2003/0066025 | A1* | 4/2003 | Gamer et al. | 715/500 |
| 2003/0070143 | A1 | 4/2003 | Maslov | 715/513 |
| 2003/0110191 | A1* | 6/2003 | Handsaker et al. | 707/503 |
| 2003/0206646 | A1 | 11/2003 | Brackett | |
| 2003/0226106 | A1 | 12/2003 | McKellar et al. | 715/513 |
| 2004/0012633 | A1 | 1/2004 | Helt | |
| 2004/0100504 | A1 | 5/2004 | Sommer | 345/810 |
| 2004/0109033 | A1 | 6/2004 | Vienneau et al. | 345/863 |
| 2004/0186775 | A1 | 9/2004 | Margiloff et al. | 705/14 |
| 2004/0230906 | A1 | 11/2004 | Pik et al. | 715/522 |
| 2004/0268231 | A1 | 12/2004 | Tunning | 715/513 |
| 2005/0010871 | A1 | 1/2005 | Ruthfield et al. | 715/712 |
| 2005/0021504 | A1* | 1/2005 | Atchison | 707/3 |
| 2005/0022116 | A1 | 1/2005 | Bowman et al. | 715/513 |
| 2005/0044500 | A1 | 2/2005 | Orimoto et al. | 715/706 |
| 2005/0183008 | A1 | 8/2005 | Crider et al. | 715/517 |
| 2005/0223329 | A1 | 10/2005 | Schwartz et al. | 715/711 |
| 2006/0036580 | A1* | 2/2006 | Stata et al. | 707/3 |
| 2006/0036944 | A1 | 2/2006 | Mims | |
| 2006/0036945 | A1 | 2/2006 | Radtke et al. | 715/708 |
| 2006/0111931 | A1 | 5/2006 | Johnson et al. | 705/1 |

FOREIGN PATENT DOCUMENTS

| | | |
|---|---|---|
| EP | 1 376 337 | 2/2004 |
| GB | 2 391 148 | 1/2004 |

OTHER PUBLICATIONS

Liu et al., "Continual Queries for Internet Scale Event-Driven Information Delivery" IEEE Transactions on Knowledge and Data Engineering, vol. 11, Issue 1, pp. 610-628, 1999.*

Chen et al., "NiagaraCQ: A Scalable Continuous Query System for Internet Databases", Int. Conf. on Management of Data, Proc. of the 2000 ACM SIGMOD Int. Conf. on Management of Data, pp. 379-390, 2000.*

Becker et al., "Virtual Folders: Database Support for Electronic Messages Classification", Pontificia Universidade Catolica do Rio Grande do Sul, Porto Alegre, Brazil, pp. 163-170.

U.S. Appl. No. 11/154,278 filed Jun. 16, 2005 entitled "Cross Version and Cross Product User Interface Compatibility".

U.S. Appl. No. 11/151,686 filed Jun. 13, 2005 entitled "Floating Command Object".

U.S. Appl. No. 11/401,470 filed Apr. 10, 2006 entitled "Command User Interface for Displaying Selectable Functionality Controls in a Database Application".

U.S. Appl. No. 10/982,073 filed Nov. 5, 2004 entitled "Gallery User Interface Controls".

U.S. Appl. No. 10/607,020 filed Jun. 26, 2003 entitled "Side-by-Side Shared Calendars".

U.S. Appl. No. 10/836,154 filed Apr. 30, 2004 entitled "Combined Content Selection and Display User Interface".

U.S. Appl. No. 10/848,774 filed May 19, 2004 entitled "Automatic Grouping of Electronic Mail".

U.S. Appl. No. 10/851,442 filed May 21, 2004 entitled "Conversation Grouping of Electronic Mail Records".

U.S. Appl. No. 10/851,506 filed May 21, 2004 entitled "Adaptive Multi-Line View User Interface".

U.S. Appl. No. 10/955,941 filed Sep. 30, 2004 entitled "An Improved User Interface for Displaying Selectable Software Functionality Controls that are Relevant to a Selected Object".

U.S. Appl. No. 10/955,940 filed Sep. 30, 2004 entitled "An Improved User for Displaying Selectable Software Functionality Controls that are Contextually Relevant to a Selected Object".

U.S. Appl. No. 10/955,967 filed Sep. 30, 2004 entitled "Command User Interface for Displaying Selectable Software Functionality Controls".

U.S. Appl. No. 10/955,942 filed Sep. 30, 2004 entitled "An Improved User Interface for Displaying a Gallery of Formatting Options Applicable to a Selected Object".
U.S. Appl. No. 10/955,928 filed Sep. 30, 2004 entitled "User Interface for Providing Task Management and Calendar Information".
U.S. Appl. No. 10/800,056 filed Mar. 12, 2004 entitled "Method and System for Data Binding in a Block Structured User Interface Scripting Language".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237.
Charles Rich et al., "Adding a Collaborative Agent to Graphical User Interfaces," 1996, ACM, pp. 21-30.
Gordon Padwick, Using Microsoft Outlook 2000, Que, Sp. Ed., May 1999.
Marshall School of Business: "Workshop IV - Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List - effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http:web.archive.org/web/20040812092939/http://www.ipi.fi/~rainy/index.php?pn=probjects&project=rainlendar>.
Microsoft Windows XP Professional, Version 2002, Service pack 2.
Camarda, Using Microsoft Word 97, copyright 1997, QUE Corporation, pp. 412, 968.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
U.S. Office Action dated Dec. 23, 2003 cited in U.S. Application No. 09/896,384.
U.S. Notice of Allowance dated Aug. 24, 2004 cited in U.S. Appl. No. 09/896,384.
U.S. Office Action dated Apr. 27, 2006 cited in U.S. Appl. No 10/800,056.
U.S. Final Office Action dated Oct. 19, 2006 cited in U.S. Appl. No. 10/800,056.
U.S. Office Action dated Apr. 12, 2007 cited in U.S. 10/851,506.
U.S. Office Action dated Jun. 4, 2007 cited in U.S. Appl. No. 10/955,940.
U.S. Office Action dated Jan. 4, 2007 cited in U.S. Appl. No. 10/607,020.
U.S. Official Action dated Jun. 14, 2007 cited in U.S. Appl. No. 10/836,154.
U.S. Official Action dated Jun. 21, 2007 cited in U.S. Appl. No. 10/955,928.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http:///www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Danish Written Opinion Appl. No. SG 200504508-3 dated Sep. 18, 2006.
Danish Search Report Appl. No. SG 200504475-5 dated Sep. 19, 2006.
NZ Application No. 541300, Examination Report dated Jul. 25, 2005.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. NO. 10/955,967.
U.S. Office Action dated Jul. 11, 2007 cited in U.S. Appl. No. 10/955,942.
Boyce,"Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascasded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn.2.microsoft.com/en-us/library/aa217660(office.11.d=printer).aspx, Sep. 2001, 5 pgs.
Budinsky et al., "WebSphere Studio Overview," http://researchweb.watson.ibm.com/journals/sj/432/budinsky.html, May 6, 2004, 25 pgs.
Danish Written Opinion Appl. No. SG 200504508-3 dated Sep. 18, 2006.
Danish Search Report Appl. No. SG 200504475-5 dated Sep. 19, 2006.
NZ Application No. 541300, Examination Report dated Jul. 25, 2005.
U.S. Notice of Allowance dated Jul. 5, 2007 cited in U.S. Appl. No. 10/607,020.
U.S. Office Action dated Jul. 11, 2007 cited in U.S. Appl. No. 10/955,941.

U.S. Office Action dated Jul. 11, 2007 cited in U.S. Appl. No. 10/955,967.
U.S. Office Action dated Jul. 11, 2007 cited in U.S. Appl. No. 10/955,942.
U.S. Office Action dated Jul. 13, 2007 cited in U.S. Appl. No. 10/800,056.
U.S. Office Action dated Sep. 26, 2007 cited in U.S. Appl. No. 11/151,686.
U.S. Office Action dated Oct. 9, 2007 cited in U.S. Appl. No. 10/982,073.
U.S. Final Office Action dated Dec. 4, 2007 cited in U.S. Appl. No. 10/955,940.
U.S. Final Office Action dated Dec. 21, 2007 cited in U.S. Appl. No. 10/851,506.
U.S. Final Office Action dated Dec. 28, 2007 cited in U.S. Appl. No. 10/800,056.
U.S. Final Office Action dated Jan. 8, 2008 cited in U.S. Appl. No. 10/955,928.

* cited by examiner

Select Names

Type Name or Select From List:
Jesse Wang

Show Names from the:
Global Address List

| Name | Business Phone | Office |
|---|---|---|
| Jesse Wang | +1 (425) 7061740 X6... | 18/20 |
| Jesse Wang (PASSPORT) | +1 (425) 7076328 X7... | REDW |
| Jesse Washington | +1 (312) 3457459 | CHIC/ |
| Jesse White (Grubb & Ellis Mgmt ... | | MOBII |
| Jesse Woldman (VMC Consulting ... | +1 (800) 4269400 X4... | MOBII |
| Jesse's FTE Direct Reports | | |
| Jessica Albrecht | +1 (952) 8374542 X4... | BLOO |
| Jessica Anderson (Kelly Services ... | +1 (425) 7066347 | 21/10 |
| Jessica Baayen | +1 (425) 7075524 X7... | REDW |
| Jessica Bair (Spherion) | | 100/L |
| Jessica Benson (Convergys) | +1 (425) 6352997 X3... | MOBII |
| Jessica Bielstein (Compaq) | +1 (425) 7061983 X6... | 18/32 |
| Jessica Bischoff (Convergys) | | MOBII |
| Jessica Boisvert | +1 (720) 5281735 X8... | DENW |
| Jessica Borjel | +46 (8) 56 30 60 35 ... | KISTA |

Sent To -> Jesse Wang

Advanced    OK    Cancel

*Fig. 8*

METHODS, SYSTEMS, AND COMPUTER-READABLE MEDIUMS FOR PROVIDING PERSISTING AND CONTINUOUSLY UPDATING SEARCH FOLDERS

CROSS-REFERENCE TO RELATED APPLICATIONS

The present application claims priority to co-pending U.S. Provisional Patent Application entitled "Combined Outlook Bar and Folder List; Automatic Grouping; Adaptive Multi-Line View; Threaded View with Easier Access to All New Email; Search Folders" filed on Jul. 1, 2003 and assigned U.S. Ser. No. 60/484,437, which is incorporated herein by reference.

FIELD OF THE INVENTION

The present invention relates to the field of routing electronic messages. More particularly the present invention relates to the storage and retrieval of electronic messages through links stored in search folders.

BACKGROUND OF THE INVENTION

Among the most useful developments in modern times is the use of electronic mail or messages (email) for efficient correspondence around the world. As numerous email items accumulate in the inbox or data store for a user, attempts are made to sort the items by priority, follow-up, alphabetically, or by filing the emails in folders for future reference or follow-up. Manually filing emails in folders can be an undesirable and costly activity yielding fruitless results. Frequently emails sought for retrieval cannot be found easily or at all because a user may not remember where the email is filed or located.

Previous email applications have the capability to auto-file and search for email items meeting user specified search criteria, however auto-file rules scatter a user's messages to different folders before they have been viewed. Furthermore, the search filters have complicated dialogs and the searches are time consuming and costly intensive and time consuming thereby hindering the utility of existing email applications. This problem is further complicated by the incapability of email items to exist in more than one folder without copying the item to multiple folders. When email items are copied to multiple folders and one copy is updated or deleted the other copies are stored in their original form thereby leading to confusion and a waste of memory.

Accordingly, there is a need for a method, system, and computer-readable medium for providing persisting and continuously updating search folders that allow for efficient, consistent, and user-friendly organization and reorganization of email items. It is with respect to these and other considerations that the present invention has been made.

SUMMARY OF THE INVENTION

Embodiments of the present invention are directed to methods, systems, and computer-readable mediums for providing a persisting search folder within a computer that continuously identifies data items that have metadata matching a query of search criteria. The data items may include emails, computer program files, electronic journal entries, electronic task lists, meeting requests, appointments, electronic contacts, and electronic notes. A search folder is created by applying a query of search criteria, selected or formulated via a graphical user interface, to a search filter. Once the search folder has been created, the search folder is made live by default or by a user requesting access by clicking on a search folder icon. When the search folder is made live, the search filter is used to populate the search folder by searching one or more data stores for data items having metadata matching the query of search criteria. When these data items are identified, a link to each data item having matching metadata is stored in the search folder to populate the search folder. Links to the same data item may coexist in multiple search folders as long as the data item has metadata matching the queries of search criteria for each search folder.

According to other aspects of the present invention, upon detecting new data items added to a data store or a change to the metadata of data items previously stored in the data store, the search folder continuously applies the search filter to the new or changed data items. Upon identifying new or changed data items having metadata matching the query of search criteria for the search folder, the search folder is updated by storing links to these data items in the search folder. Also, upon identifying a previously stored data item having changed metadata that no longer matches the query of search criteria, the search filter removes the link to these data items from the search folder. This persistent application of a search filter allows for a continuous update to the contents of a live search folder.

According to still other aspects of the present invention when a user requests access to the search folder, each link stored in the search folder is displayed via the graphical user interface. The user may then select links from the display by clicking on a link to retrieve the data item matching the query of search criteria populating the search folder. Also, each search folder is represented by a search folder icon and a search folder title in the graphical user interface displayed on the computer. When a search folder is made live, the text of the search folder title is changed from italic, representing that the search folder is dead, to non-italic representing that the search folder is live. Search folders that are created but remain dead are not populated and are thus, prevented from utilizing computer processor cycles to search and populate until being made live. Search filters of dead search folders are also prevented from being continuously applied to new electronic messages arriving and previously stored electronic messages having changed metadata.

According to another aspect of the present invention, queries of search criteria may be ready-made and selected by the user selecting a template via a graphical user interface listing templates. Each template represents a query of search criteria for a search folder that may be a ready-made query of search criteria or a ready-made query of search criteria having specified inputs. In the case of email data items, a specialized input may be the names of email senders or the memory size of an email. It should be appreciated that when multiple specified inputs are received in the query of search criteria, the multiple specified inputs may be queried in an 'or' format or an 'and' format. Furthermore in the email context, in addition to having a link stored in the search folder, new emails having metadata matching a query of search criteria are also identified and delivered to an inbox of the user. It should also be appreciated that a search folder created on one client computer may roam with a profile of the user when the user logs on to a different client computer.

According to still other aspects a search may be conducted within the search folder. When the search within the search folder is stored as a new search folder, the new search folder contains links to emails having metadata matching the search criteria of at least two queries. The queries are combined in the new search folder thereby presenting at least two views of the data store via the new search folder. Additionally, emails may be moved from a current search folder to a hard folder in the data store. When emails are moved, the search filter still detects whether the email continues to have metadata matching the query of search criteria for the current search folder. In response to the email continuing to have metadata matching the query of search criteria, the current search folder retains a link to the email. It should also be appreciated that in response to the deletion of a link to an email from the search folder, the email and any links to the email are deleted from the data store by which the search folder was populated.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIGS. 8 is a computer screen display showing illustrative user interface for selecting or inputting one or more names, email addresses, or distribution lists in a 'Mail sent to a distribution list or person' search folder according to an embodiment of the present invention.

DETAILED DESCRIPTION

As described briefly above, embodiments of the present invention are directed to methods, systems, and computer-readable mediums for providing persisting and continuously updating search folders. Search folders are also referred to as smart or virtual folders. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is, therefore, not to be taken in a limiting sense and a scope of the present invention is defined by the appended claims and their equivalents.

Figure 1:
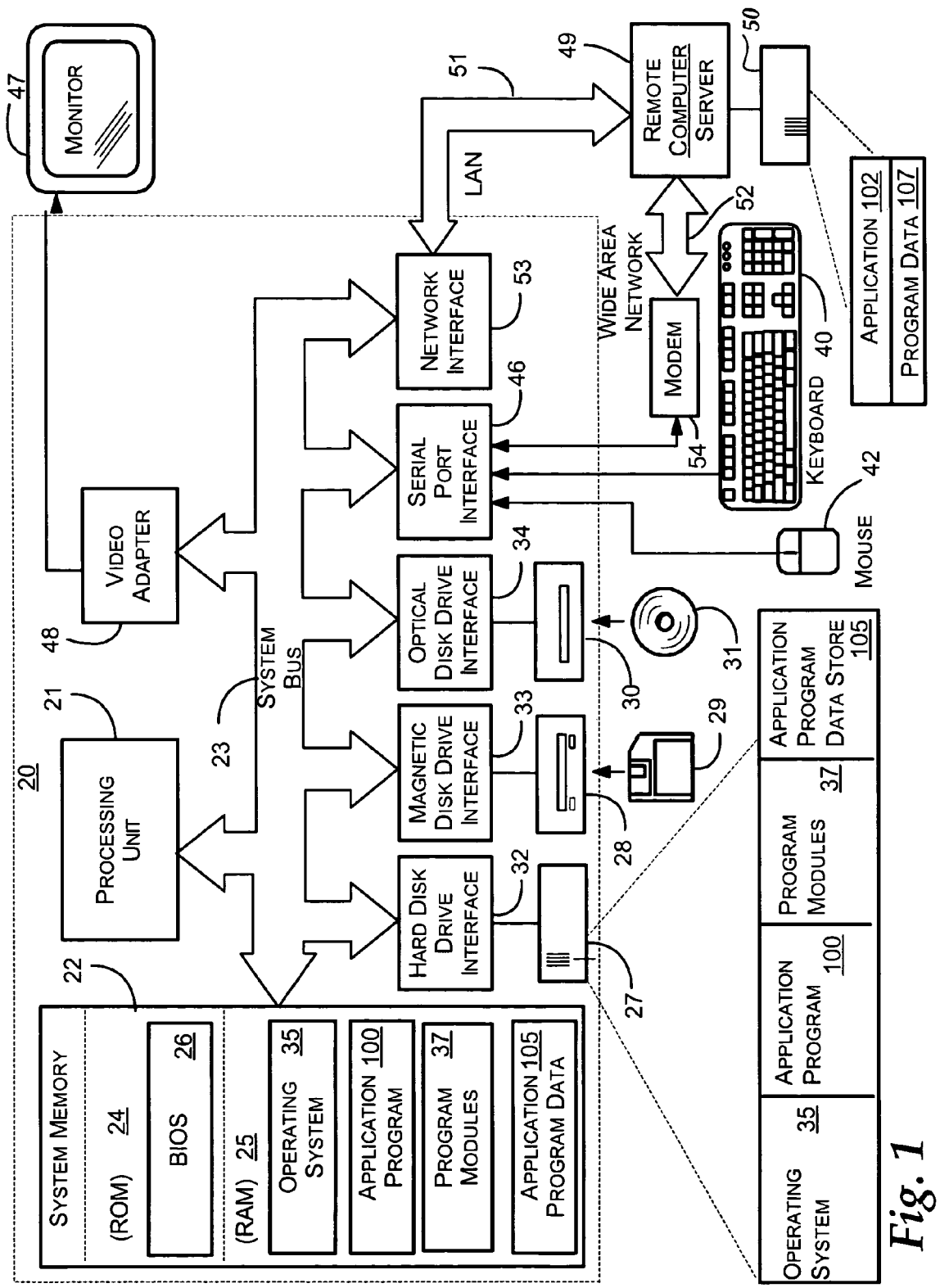
FIG. 1 is a block diagram showing the architecture of a personal or server computer that provides an illustrative operating environment for an embodiment of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal or client computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes data stores such as a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

A number of program modules may be stored in the drives and RAM 25, including an operating system 35, one or more application programs 100, such as an electronic messaging application program, a web browser application program module 37, such as INTERNET EXPLORER from MICROSOFT CORPORATION of Redmond, Wash., (or other type of program module), application program data 107, such as stored emails, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules and data depicted relative to the personal computer 20, or portions thereof, may be stored in the remote memory storage device 50. It will be appreciated that the network connections shown are exemplary and other means of establishing a communications link between the computers may be used.

Figure 2:
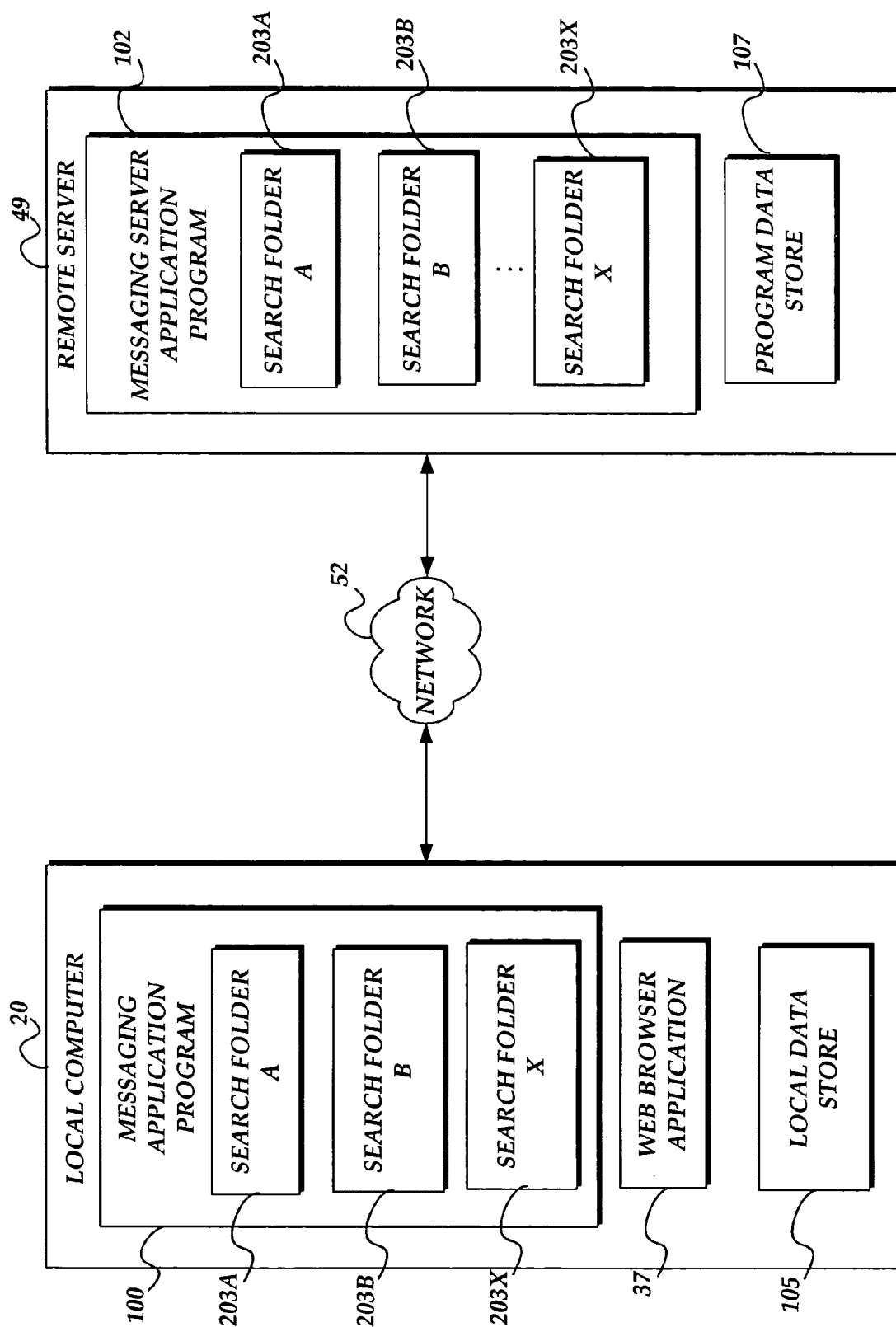
FIG. 2 is a simplified block diagram showing interaction between a local computer and a remote server computer in an embodiment of the present invention.

FIG. 2 is a simplified block diagram showing interaction between a local client computer 20 and a remote server computer 49 in an embodiment of the present invention. The messaging application program 100, such as MICROSOFT OUTLOOK from MICROSOFT CORPORATION of Redmond, Wash., and the messaging server application program 102 such as MICROSOFT EXCHANGE from MICROSOFT CORPORATION of Redmond, Wash., are computer software applications having sufficient computer executable instructions for supporting email messaging activity and for providing, populating, and updating search folders. According to an embodiment of the present invention, the search folders 203 may be created and stored on the client computer 20 and/or on the server computer 49. The search folders 203 are virtual messaging application program interface (MAPI) folders that contain links to all data items that meet or match a specific query of search criteria within a data store 105 and/or a data store 107. The data store 105 contains a cached version of data items stored in the data store 107 and associated with a user of the client computer 20, such as in MICROSOFT OUTLOOK offline files and offline personal folders from MICROSOFT CORPORATION of Redmond, Wash. Thus, search folders may access either or both data stores 105 and 107 to conduct populating queries.

For example, in an offline scenario a search folder 203A may be created on the client computer 20. In response to a user seeking access to the search folder 203A, a search filter will automatically populate the search folder 203A by sorting the data items in the local data store 105. The data items, such as emails, are sorted based on contents or metadata found in one or more of the data item fields. Links to the data items matching the query of search criteria applied to the search filter for the search folder 203A will populate the search folder 203A. Additionally, the search filter continues to filter links to any new or changed data items matching the search criteria into the search folder 203A.

Alternatively, in an online scenario, the same search folder 203A may be created on the remote server computer 49. When a user requests access to the search folder 203A via the client computer 20, a search filter for search folder 203A sorts the data items stored in the data store 107 that are associated with the user. Links to the data items matching the search query automatically populate the search folder 203A. Although the user interfaces with the search folder 203A from the client computer 20, the searching and updating takes place on the remote server computer 49.

Figures 3, 4:
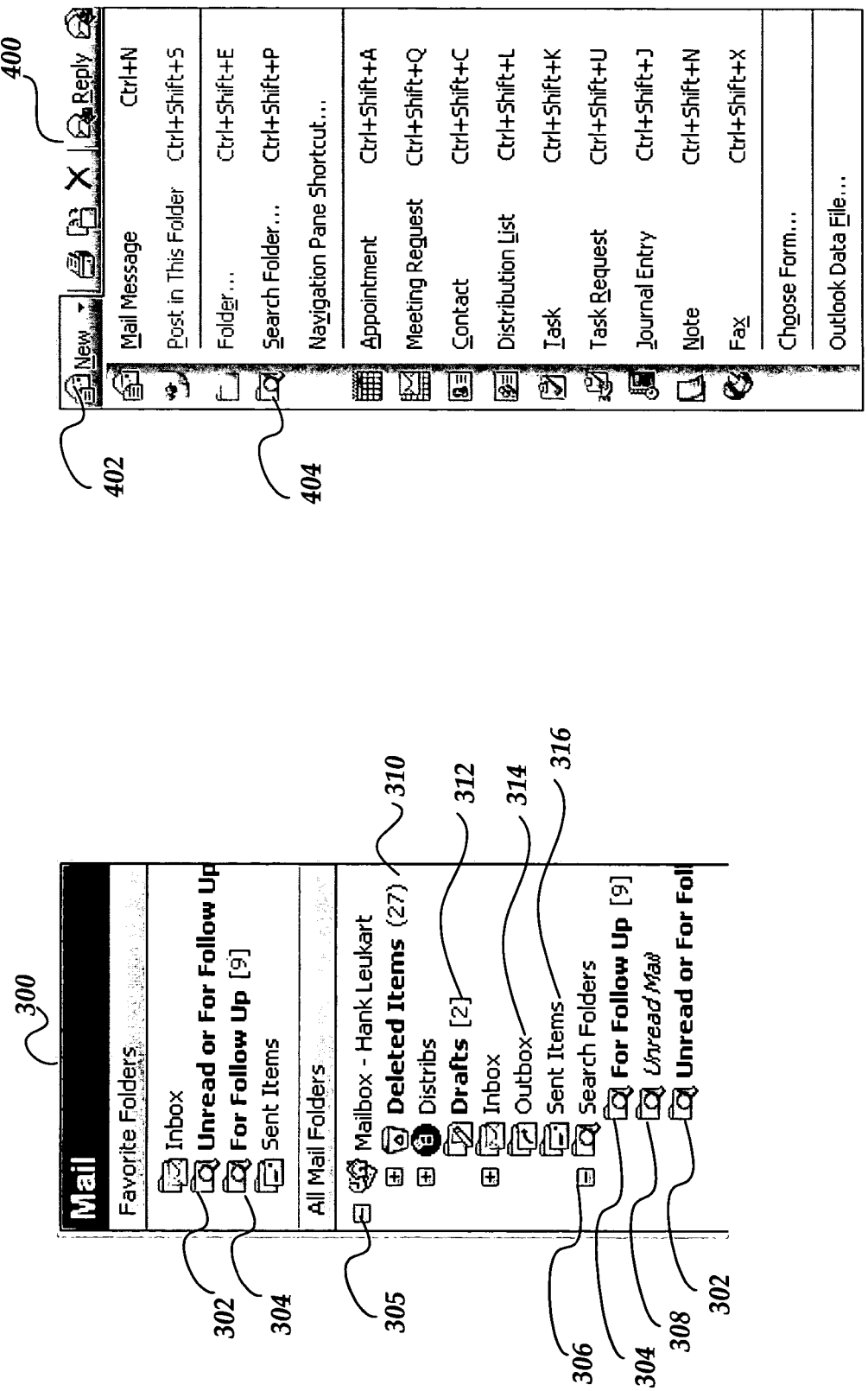
FIG. 3 is a computer screen display showing an illustrative folder tree in an email navigation pane including a persisting list of search folders available to a user for viewing according to an embodiment of the present invention.
FIG. 4 is a computer screen display showing an illustrative user interface menu for initiating the creation of a search folder according to an embodiment of the present invention.

FIG. 3 is a computer screen display 300 (hereinafter display 300) showing an illustrative folder tree in an email navigation pane including a list of search folders available to a user for viewing according to an embodiment of the present invention. A user may view and navigate through a current search folder inventory from the display 300. A section for favorite or frequently accessed folders may include search folders. For instance, both an 'Unread or For Follow Up' search folder 302, containing links to emails marked as unread or marked for follow up, and a 'For Follow Up' search folder 304 are displayed in the 'Favorite Folders' section of the display 300 and in the 'All Mail Folders' section of the display 300.

As shown in FIG. 3, each search folder has a distinctive icon and a title that identifies the type, contents, and status of the folder. For instance, the 'For Follow Up' search folder 304, containing links to emails marked for follow up, has the distinctive search folder icon and the title is in a bold non-italic text indicating that the folder is live and populated with links to emails of the user marked for follow up. The number nine (9) next to the title may indicate the number of unread links in the search folder 304 or the number of links stored in the search folder 304. A main search folder listing 306 is available inside the folder tree of a mailbox 305 belonging to a user. Opening the main search folder listing 306, gives a user access to a list of all the search folders created in the user's email profile. It should be appreciated that the search folders listed in a user's profile roam with the user when the user logs on to a different client computer.

Search folders with italic titles, such as the 'Unread Mail' search folder 308, are created but inactive or dead because a user has not requested access to view the contents of the search folder. A created search folder is made live by a request for access to its contents by clicking on the icon. After the search folder is made live the folder is populated and the title text is changed to non-italic text, in this case bold. Bold text may indicate that there are unread contents in the search folder or that there are contents in the search folder. When links to new or changed data items arrive at the search folder the distinctive search folder icon animates and the quantity of unread data items or data items in the folder increments as notification to the user.

FIG. 4 is a computer screen display 400 showing an illustrative user interface menu for initiating the creation of a search folder according to an embodiment of the present invention. A user can create a search folder by selecting the menu commands File, New 402, and search folder 404. In the alternative, a search folder may be created by saving an 'Advanced Find' as a search folder or from a context menu on an existing search folder. Additional details regarding the creation of search folders will be described below with respect to FIGS. 14A and 15A-B.

Figure 5:
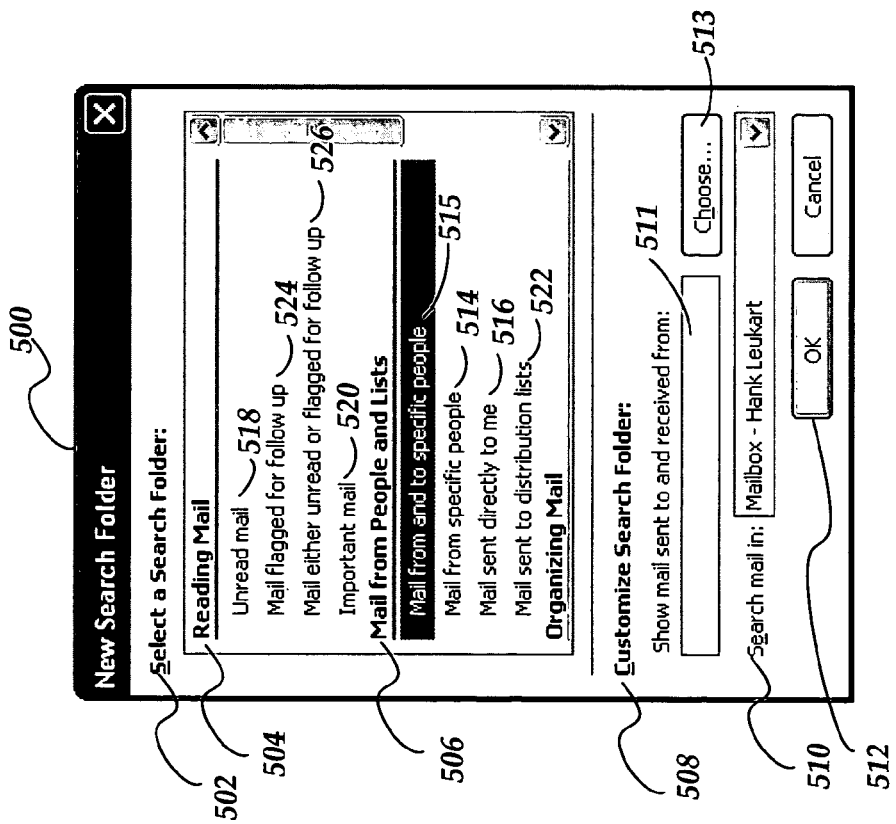
FIG. 5 is a computer screen display showing an illustrative graphical user interface for selecting search folder templates that aid in the creation of search folders according to an embodiment of the present invention.

FIG. 5 is a computer screen display showing an illustrative graphical user interface 500 for selecting search folder templates that aid in the creation of search folders according to an embodiment of the present invention. The user interface 500 is displayed in response to a user making a request to create a search folder as described in FIG. 4. Instead of displaying a complicated search filter to the user, a set of easy, ready-made templates are displayed to help the user set up search folders for the most common data items (emails) a user may want to view. The search folder templates may be sorted within the user interface 500 by category. One category may be a 'Reading Mail' category 502 that includes search folders for emails especially marked for reading, importance, or follow up. For instance, when the 'Unread Mail' template 518 is selected by a user the messaging application creates a search folder with a search filter that may query the data stores 105/55 for emails marked as unread and store links the those emails in the search folder 308. The search folder 308 is where all unread emails may be viewed in one place.

Similarly, when the 'For Follow Up' template 524 is selected, the messaging application 100/102 creates a search folder 304 that stores links to emails marked for follow up. Additionally, a 'Mail either unread or flagged for follow up' template 526 may be selected. This template combines the templates 518 and 524 in an 'OR' query to store both links to emails marked for follow up and links to emails marked as unread in the search folder 302. Other reading mail templates include an 'Important mail' template 520 that creates a place to view all emails sent to the user and marked as important.

Another category may include a 'Mail from People and Lists' category 502 which includes templates that aid in the creation of search folders that query emails to and/or from specifically named people, email addresses, and/or distribution lists. The templates listed in this category may require additional information besides just selecting the template. For instance, the 'Mail from or to specific people' template 515, also known as the 'Conversations with specific people' template 515, requires an input of the names or email addresses of the one or more people desired in the conversation. The template 515 is highlighted in FIG. 5 as an indication of being selected. The 'Choose' button 513, the edit box 511 and the static text above the edit box 511 are shown or hidden depending on the selected template. The static text above the edit box 511 is different for every template. The 'Choose' button 513 is the same for all templates but retrieves varied dialog screens for each template.

Figure 7:
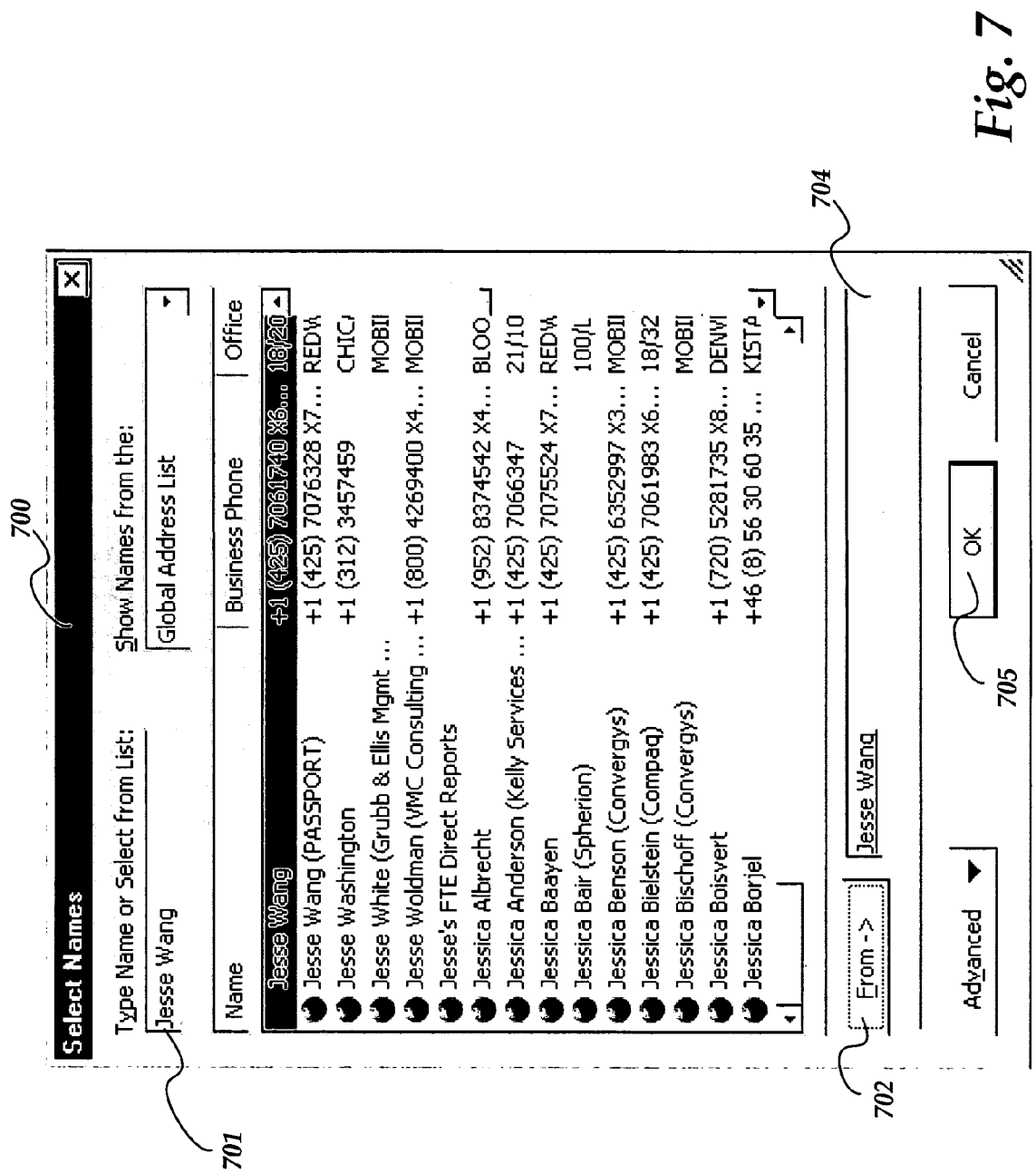
FIG. 7 is a computer screen display showing an illustrative user interface for selecting or inputting one or more names, email addresses, or distribution lists in a 'Mail from specific people and lists' search filter according to an embodiment of the present invention.

Referring back to template 515, when the 'Choose' button 513 is selected to input or change the necessary information that formulates the query that will eventually appear in the edit box 511, another user interface is presented to the user. Template 515 combines the 'Mail from specific people' template 514, and the 'Mail sent to distribution lists' template 522 in an 'OR' query. Turning now to FIG. 7 a computer screen display showing an illustrative user interface 700 for selecting or inputting one or more names, email addresses, or distribution lists in a 'Mail from specific people and lists' search filter according to an embodiment of the present invention will be described. The user interface 700 is presented in response to selecting the 'Choose' button 513 after selecting templates 515 or 514. The user may then select or input names, email addresses, and/or distribution lists in the name box 701. Once a name, address, or list has been selected it is placed in the sender box 704 by clicking the 'From' button 702. After the sender box 704 has been populated, the 'OK' button 705 may be selected to return to templates 514 or 515 in FIG. 5 where the edit box 511 is filled in with the selected names, email address, and distribution lists. When more than one name is selected the names are 'OR'ed together in the query and listed in the edit box 511. Additionally, when a distribution list is selected the individual email addresses of the list are placed in the query and listed in the edit box 511.

Turning now to FIG. 8 a computer screen display showing an illustrative user interface for selecting or inputting one or more names, email addresses, or distribution lists in a 'Mail sent to a distribution list or person' search folder according to an embodiment of the present invention will be described. The user interface 800 is presented in response to selecting the 'Choose' button 513 after selecting templates 515 or 522. Template 522 creates a query for a search folder links to emails to a specific person, email address, or distribution list. Once the user interface 800 is presented, the user may then select or input names, email addresses, and/or distribution lists in the name box 804. Once a name, address, or list has been selected it is placed in the sender box 808 by clicking the 'To' button 807. After the sender box 808 has been populated, the 'OK' button 809 may be selected to return to templates 522 or 515 in FIG. 5 where the search criteria edit box 511 is filled in with the selected names, email address, and distribution lists. When more than one name, address, or list is selected they are 'OR'ed together in the query and listed in the search criteria edit box 511.

The 'Mail sent directly to me' template 516 creates a search folder to view all email sent directly to the email address of the user. The search filter for template 516 queries all the emails to sort data items where the user's name or email address is in a 'TO' or copy 'CC' field. Because no additional information is required for the template 516 query, the 'OK' button 512 is automatically enabled for template 516. The 'OK' button 512 may be grayed out until a template is selected and the necessary information has been filled out. In some templates, such as templates 516, 518, 524, 526, and 520, no extra information is necessary and the 'OK' button 512 is enabled once the template is selected. Once the 'OK' button 512 is selected, a search folder is created based on the selected template criteria. It should be appreciated that the given titles of the search folders remain by default, however, as will be described below with respect to FIG. 13, a user may change or rename a title of a search folder.

A customized search folder may be created by selecting the 'Customize Search Folder' link 508, shown in FIG. 5, which returns a user interface dialog that aids the user in formulating custom search query criteria. Additional information regarding custom search folders is described below with respect to FIGS. 12A-12D. The 'Search mail in' dropdown 510 contains a list of the user's folder stores and has a default setting. The setting for dropdown 510 determines the folders that will be queried to populate the search folder created. Referring back to FIG. 3, it should be appreciated that for functionality purposes the 'Drafts' 312, 'Outbox' 314, 'Sent Items' 316, and 'Deleted Items' 310 folders, although part of the mailbox 305, may be excluded from a query when appropriate. However in some cases, for example with templates 515 and 522, the 'Sent Items' folder 316 may be included in the query.

Figure 6:
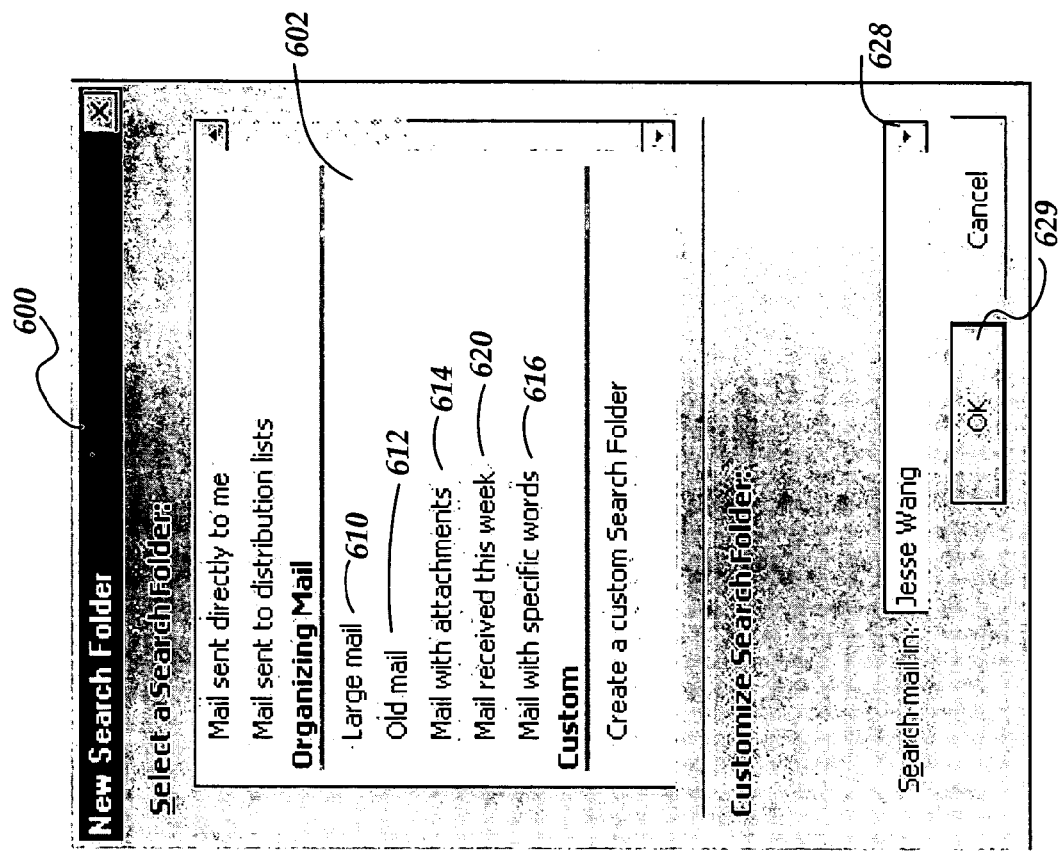
FIG. 6 is a computer screen display showing another view of the illustrative user interface of FIG. 5 for a different user selecting search folder templates that aid in the creation of search folders according to an embodiment of the present invention.

FIG. 6 is a computer screen display showing another view of the illustrative user interface of FIG. 5 for a different user selecting search folder templates that aid in the creation of search folders according to an embodiment of the present invention. As described above with respect to FIG. 5, a list of ready-made templates is presented to the user for selection. Other available ready-made templates include: a 'Large mail messages' template 610, an 'Old mail messages' template 612, a 'Mail with attachments' template 614, a 'Mail with specific words' template 616, and a 'Mail received this week' template 620. The user interface 600 operates in the same manner as the user interface 500 described above.

Figure 9B:
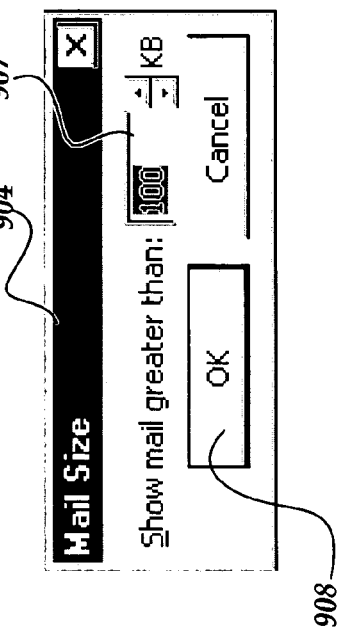
FIGS. 9A-9B are computer screen displays showing illustrative user interfaces for creating a 'Large mail messages' search folder according to an embodiment of the present invention.
Figure 9A:
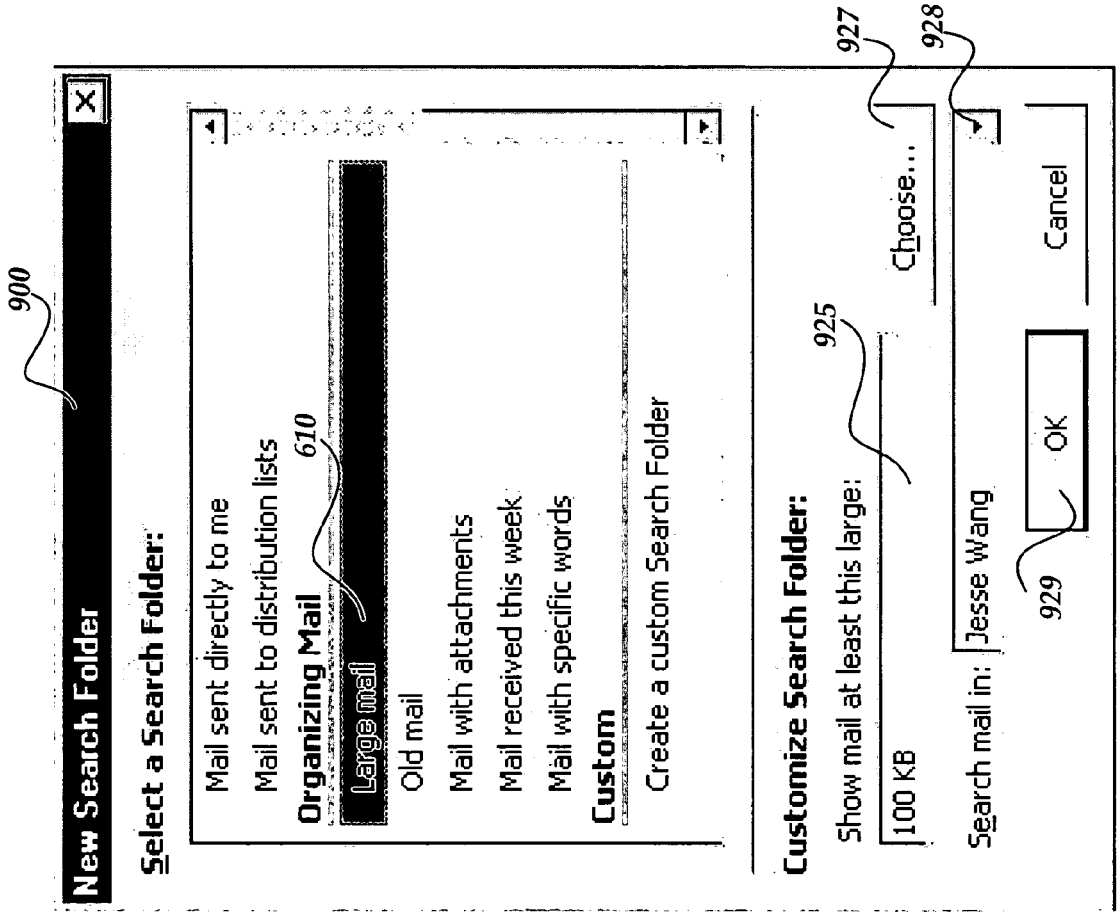

Turning now to FIGS. 9A-9B, computer screen displays showing illustrative user interfaces for creating a 'Large mail messages' search folder according to an embodiment of the present invention will be described. The template 610 creates a search folder to view all email messages in the selected data store box 928 that are larger than the size specified in the criteria edit box 925. The user interface 600 converts to the user interface 900, shown in FIG. 9A, upon selection of the template 610. A default value for the size of the messages to sort in the query is displayed in the criteria edit box 925. Thus, the 'OK' button 929 is enabled upon selection of the template 610. When the user wants to change the default size, the 'Choose' button 927 is selected.

In response to selecting the 'Choose' button 927, the user interface 904 (shown if FIG. 9B) is displayed to the user. The interface 904 shows the value of memory size selected for the search criteria in the size entry box 907. After the size has been input, the user may select the 'OK' button 908, to return to the interface 900 where the edit criteria box 925 changes to reflect the size selected in the interface 904.

Figure 10B:
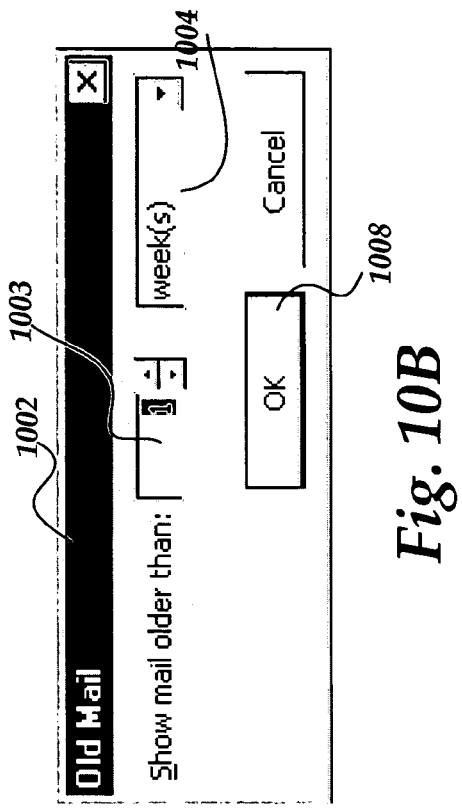
FIGS. 10A-10B are computer screen displays showing illustrative user interfaces for creating an 'Old mail messages' search folder according to an embodiment of the present invention.
Figure 10A:
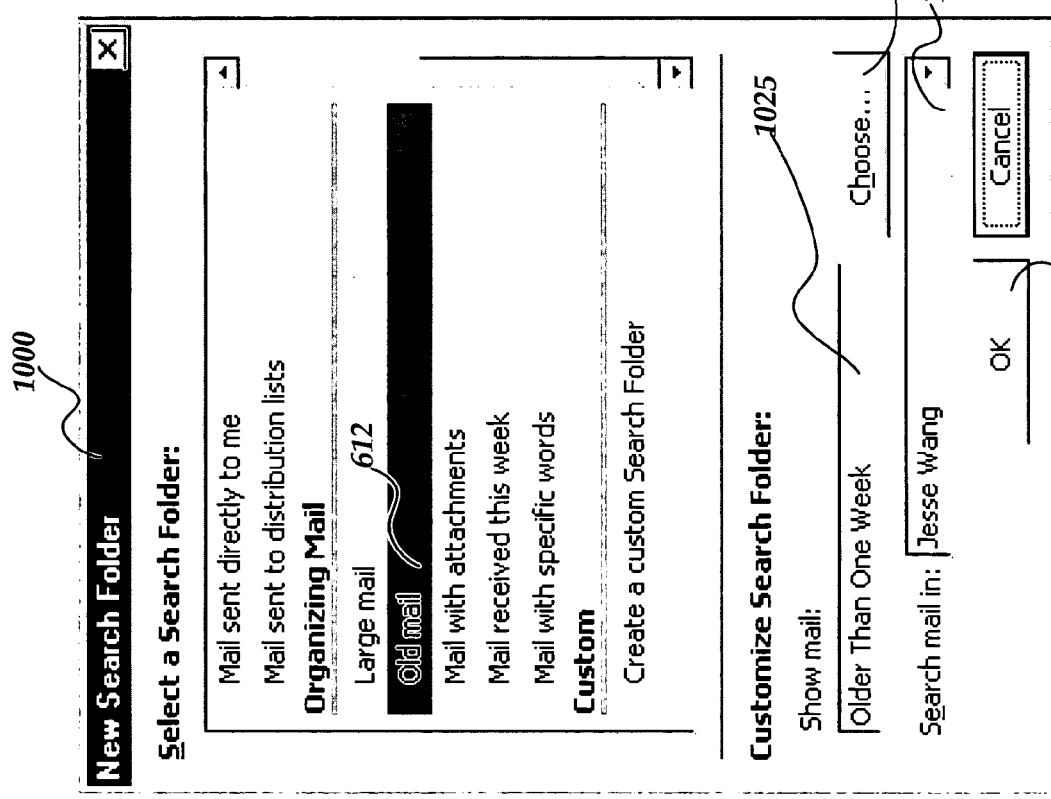

Returning to FIG. 6, in response to the selection of the 'Old mail' template 612, the descriptive text below the template selection box 602 changes according to the template selected. Turning now to FIGS. 10A-10B, computer screen displays showing illustrative user interfaces for creating an 'Old mail' search folder according to an embodiment of the present invention will be described. The template 612 creates a search folder to view all email messages in the selected data store 1028 that are older than the range of time specified in the criteria edit box 1025. The user interface 600 converts to the user interface 1000, shown in FIG. 10A, upon selection of the template 612. In order to specify the range of time, the 'Choose' button 1027 is selected.

In response to selecting the 'Choose' button 1027, the user interface 1002 (shown if FIG. 10B) is displayed to the user. The interface 1002 receives inputs for the range of time selected for the search criteria in the quantity entry box 1003 and the time entry dropdown 1004. The time entry dropdown 1004 may include: 'at least X days old', at least X months old, and 'at least X week(s) old, where X is the value entered in the quantity entry box 1003. After the range of time has been input, the user may select the 'OK' button 1008, to return to the interface 1000 where the edit criteria box 1025 changes to reflect the range of time selected in the user interface 1002. The 'OK' button 1029 may then be selected to create the 'Old mail' search folder.

Returning to FIG. 6, the 'Mail with attachments' template 614 aids in the creation of a search folder where email messages in the selected data store having attachments may be accessed. Also the 'Mail received the same week' template 620 aids in the creation of a search folder where emails in the selected or default data store and received in the current week may be accessed. Because no additional information is required for the templates 614 and 620, the 'OK' button 629 is enabled, upon selecting these templates.

Figure 11A:
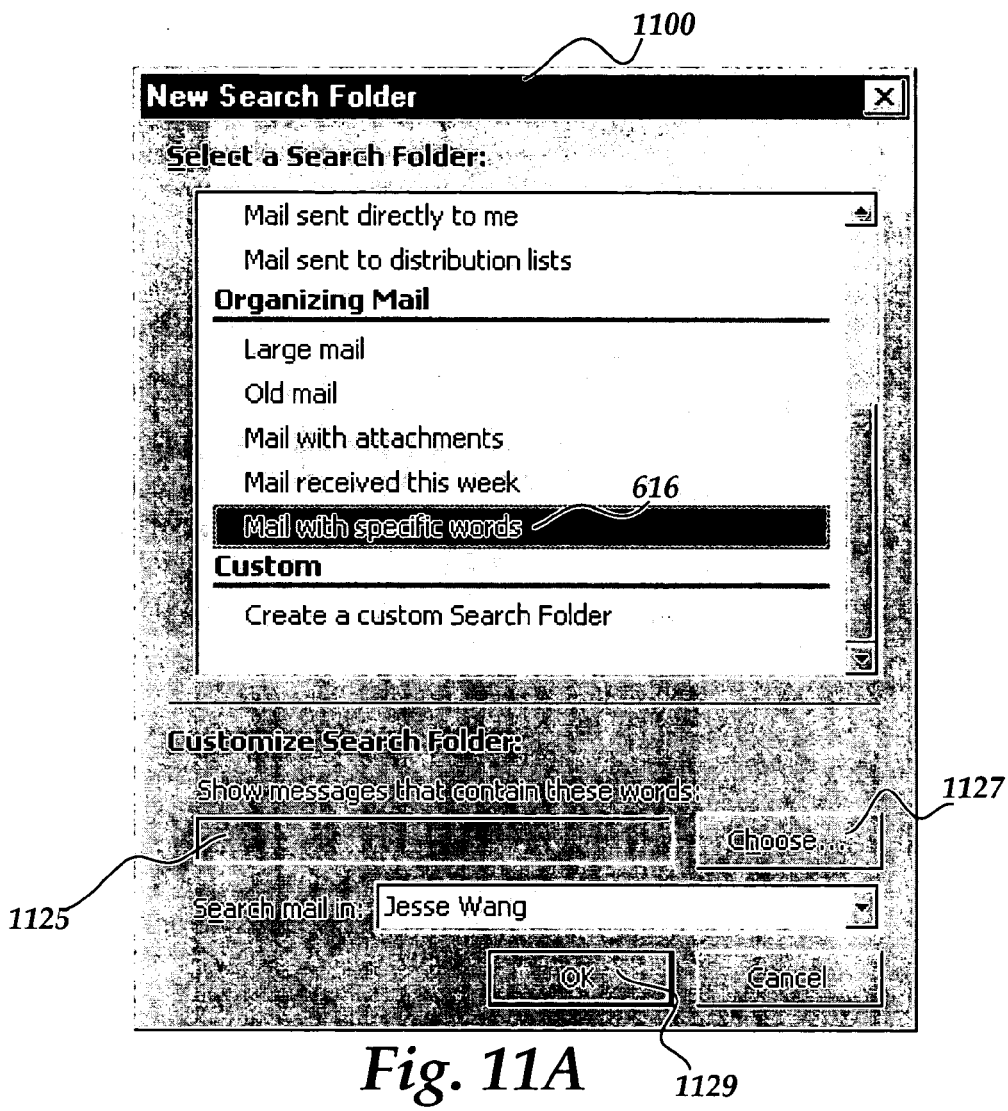
FIGS. 11A-11B are computer screen displays showing illustrative user interfaces for creating a 'Mail with specific words' search folder according to an embodiment of the present invention.
Figure 11B:
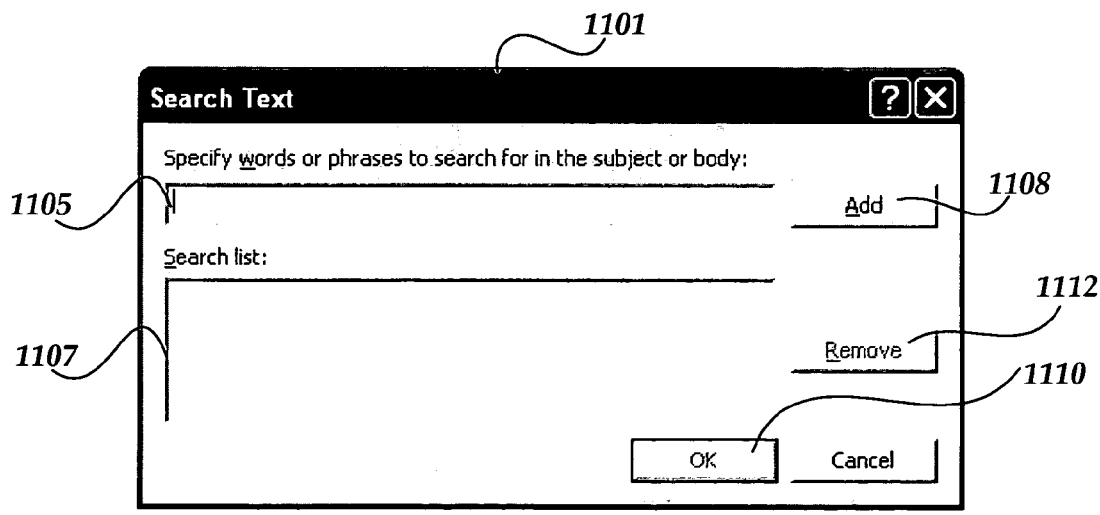

In response to the selection of the 'Mail with specific words' template 616, the descriptive text below the template selection box 602 changes according to the template selected. Turning now to FIGS. 11A-11B, computer screen displays showing illustrative user interfaces for creating an 'Mail with specific words' search folder according to an embodiment of the present invention will be described. The template 616 creates a search folder to view all email messages in the selected data store 628 that have the specified words displayed the criteria edit box 1125 as metadata in the body or subject fields of the email. The user interface 600 converts to the user interface 1100, shown in FIG. 11A, upon selection of the template 616. In order to specify the search criteria words, the 'Choose' button 1127 is selected.

In response to selecting the 'Choose' button 1127, the user interface 1101 (shown if FIG. 11B) is displayed to the user. The interface 1101 receives input for the specific words or phrases selected for the search criteria in the add entry box 1105. Once an input has been entered, the 'Add' button 1108 is selected to add the entered words to the search list area 1107. Once added to the search list area 1107, words or phrases may be removed by highlighting the words or phrases and selecting the 'Remove' button 1112. Once a desired search list has been added to the search list area 1107, the user may select the 'OK' button 1110, to return to the interface 1100 where the edit criteria box 1125 changes to reflect the words or phrases selected in the user interface 1101. When more than one word or phrase is entered, they are 'OR'ed together in the query. The 'OK' button 1129 may then be selected to create a 'Mail with specific words' search folder.

As described briefly above with respect to FIG. 5, a customized search folder may be created by selecting the 'Customize Search Folder' link 508 or the template 618 of FIG. 6 which returns a user interface dialog that aids the user in formulating custom search query criteria. When the template 618 is selected the 'Custom Search Folder' dialog shown in FIGS. 12A-12D becomes accessible. FIGS. 12A-12D are computer screen displays showing illustrative user interfaces for creating custom search folders according to an embodiment of the present invention. The user interface 600 becomes the user interface 1200 upon selecting the template 618. Upon selecting the choose button 1205, the user interface 1201 appears.

Figure 12A:
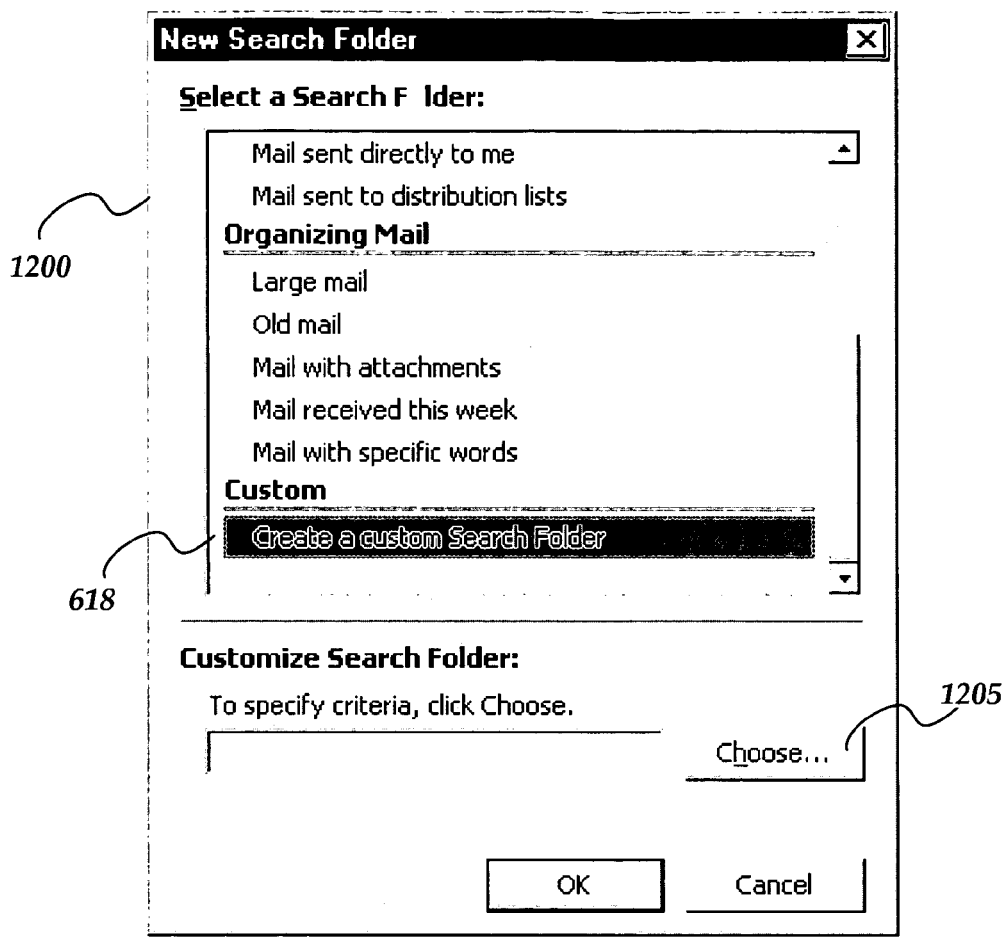
FIGS. 12A-12D are computer screen displays showing illustrative user interfaces for creating a custom search folder according to an embodiment of the present invention.
Figure 12B:
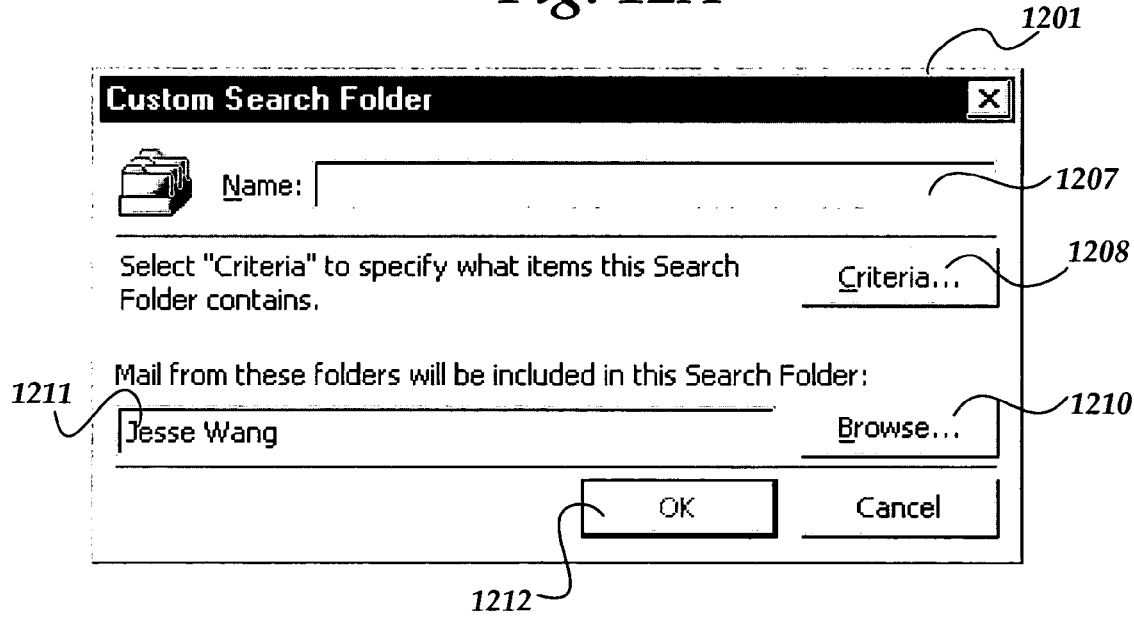
Figure 12C:
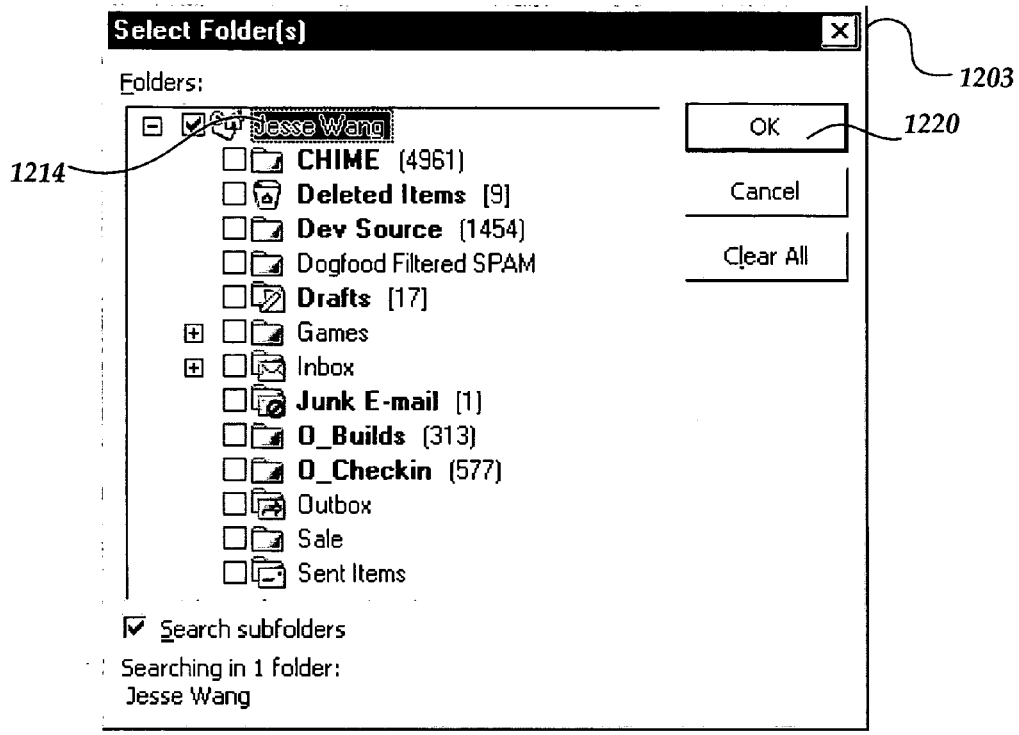

The 'Custom Search Folder' user interface 1201 shown in FIG. 12B is utilized to formulate custom queries to populate custom search folders. The 'Name edit' box 1207 is operative to receive an input naming the custom search folder. When the user selects the 'Browse' button 1210, a 'Folder selection' user interface 1203, shown in FIG. 12C, is presented. The user interface 1203 facilitates the choice of data store folders to include in the query of search criteria displayed in the 'Folder selection' box 1211 shown in FIG. 12B. As shown in the 'Folder selection' box 1211, the selected folder chosen in the interface 1203 a user's folder 1214. It should be appreciated that folders without the distinctive search folder icon are 'hard' folders that contain the actual emails or copies of emails and not simply a link to the actual email as is the case for search folders.

Figure 12D:
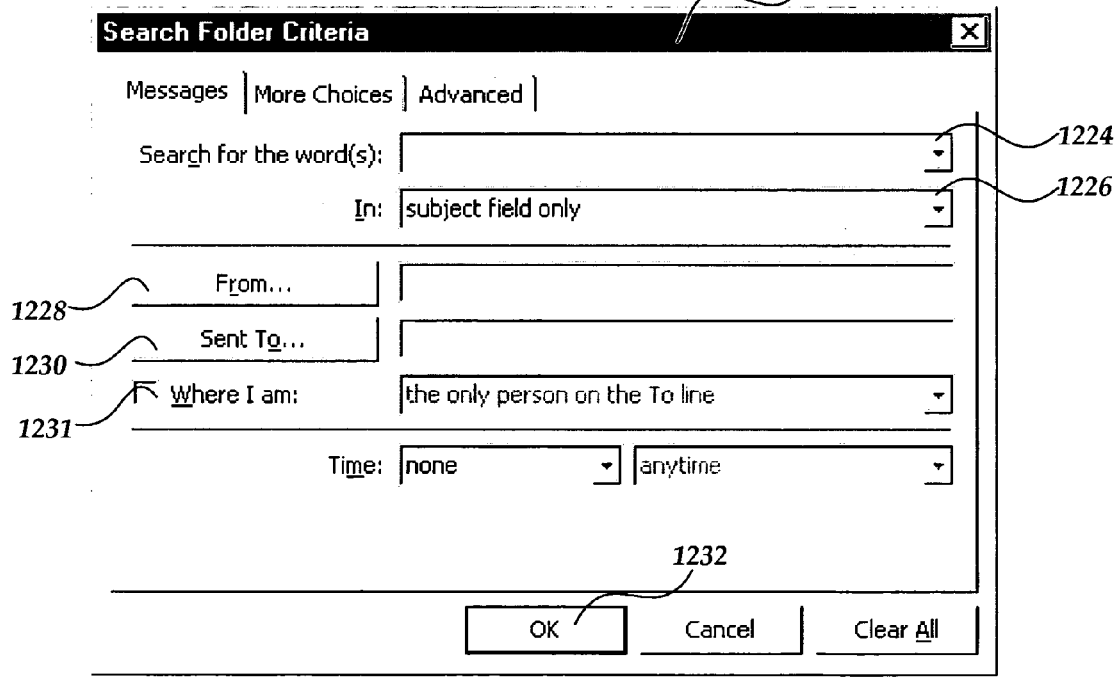

When the user selects the 'Criteria' button 1208, shown in FIG. 12B, the 'Search folder criteria' user interface 1222, shown if FIG. 12D, is presented to allow the user to formulate the criteria for the custom search folder. The user may select and input various criteria for the custom search folder including specific search words in a particular field of the email as illustrated with dropdowns 1224 and 1226. Custom queries may also include names, email addresses, and distribution lists queried in the 'From' and 'To' fields of the emails as illustrated by the 'From' input 1228 and the 'Sent To' input 1230. The user may also include specifics concerning where and how their name is located in the queried emails, as illustrated by check box 1231. After entering the criteria, the user may select the 'OK' button 1232 to return to the 'Custom Search folder' interface 1201 shown in FIG. 12B. Once the user specifies a name for the custom folder and the criteria, a click of the 'OK' button 1212 returns the user to the 'New Search Folder' user interface 600 shown in FIG. 6. When the user selects or clicks the 'OK' button 612 in the custom folder dialog, the custom search folder is created and added to the list of search folders described with respect to FIG. 3.

Figure 13:
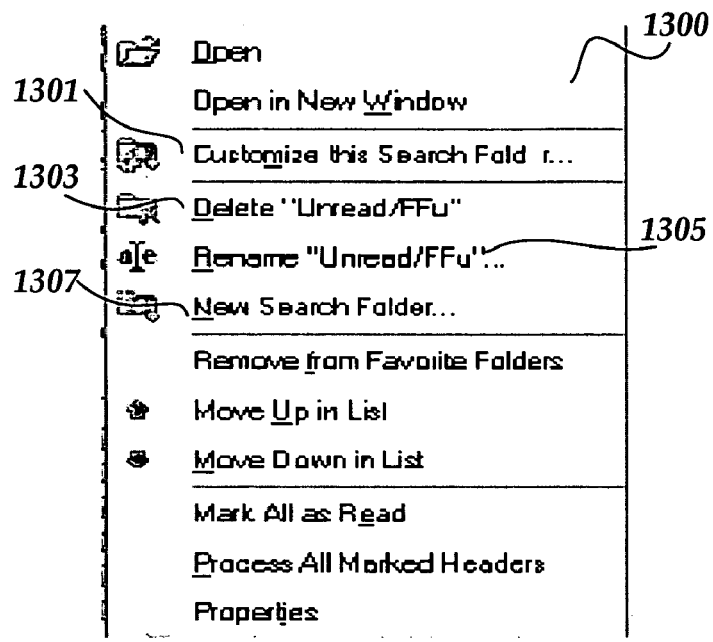
FIG. 13 is a computer screen display showing an illustrative user interface menu for manipulating the contents of smart folders according to an embodiment of the present invention.

FIG. 13 is a computer screen display showing an illustrative user interface context menu 1300 for manipulating the context of smart folders according to an embodiment of the present invention. When a user right-clicks on a search folder, the user interface context menu 1300 is displayed. As shown in the menu, the current name of the search folder is 'Unread/FFu'. By selecting 'delete' menu function 1303, a user may delete the search folder. When a search folder is deleted, the underlying or source emails are not deleted, just the search folder. In the alternative, a search folder may be dragged to the deleted items folder to permanently delete the search folder.

Additionally, by selecting 'Rename' menu function 1305, a user may rename a search folder. Each search folder 203 may have a unique name per data store on which the search folder queries. Upon selection of the menu function 1305 and edit box is displayed so the user may type in a new name. A user may also initiate the creation of a new search folder from the context of an existing search folder by selecting the 'New Search Folder' menu function 1307. This opens the 'New Search Folder' user interface 600 described above with respect to FIG. 6 to allow the use to create a new search folder. Further a user may change the search criteria of a search folder by selecting the 'Customize this Search Folder' menu function 1301. Choosing this context menu option renders a 'Custom Search Folder' user interface 1402 described below with respect to FIG. 14.

Figure 14:
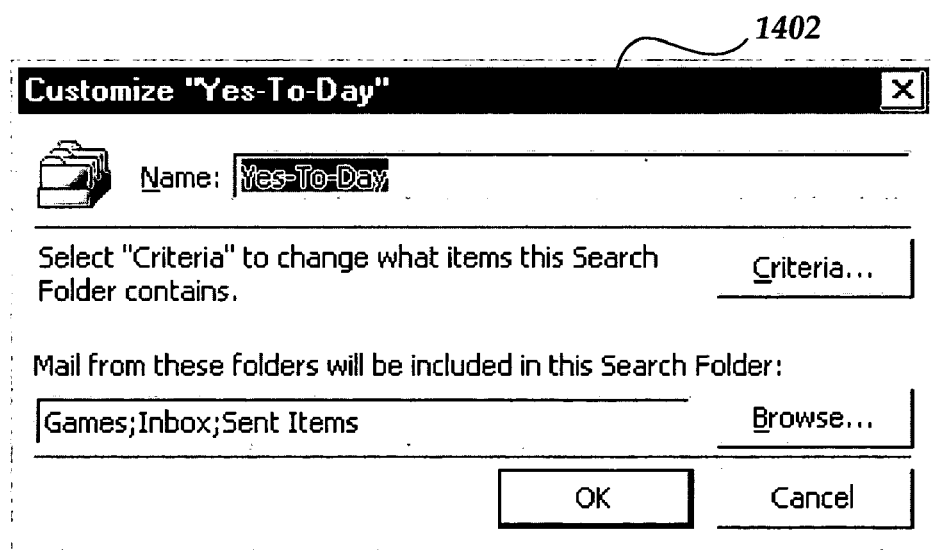
FIGS. 14 is a computer screen display showing the illustrative user interface of FIG. 12B modified for changing a search folder according to an embodiment of the present invention.

FIGS. 14 is a computer screen display showing the illustrative user interface 1402 of FIG. 12B modified for changing a search folder according to an embodiment of the present invention. The 'Custom Search Folder' user interface 1402 is the same interface used to create a custom search folder and is rendered even when the search folder was originally created using a template. Operation of the user interface 1402 for changing search criteria and the name of the search folder is described above with respect to FIGS. 12B-12D.

Figure 15A:
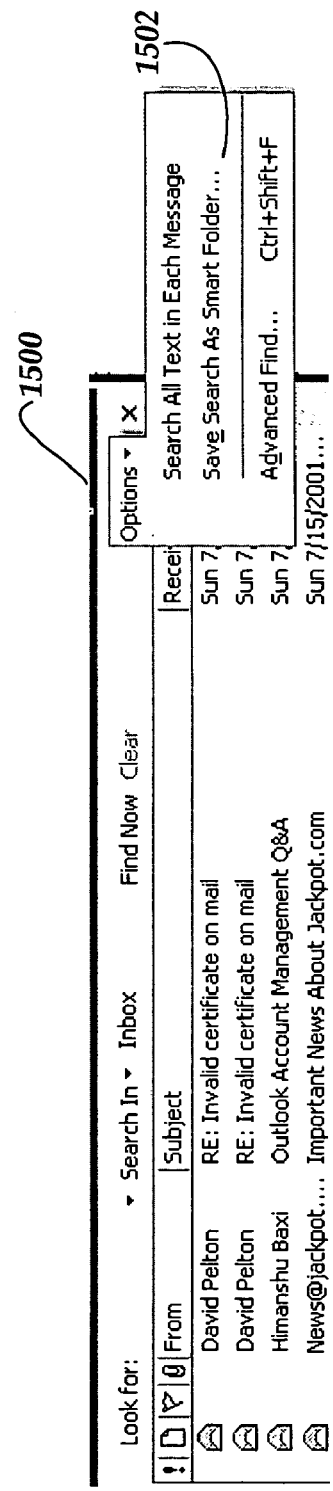
FIGS. 15A-15B are computer screen displays showing illustrative user interfaces for creating search folders from 'Find' and/or 'Advanced Find' search results according to an embodiment of the present invention.
Figure 15B:
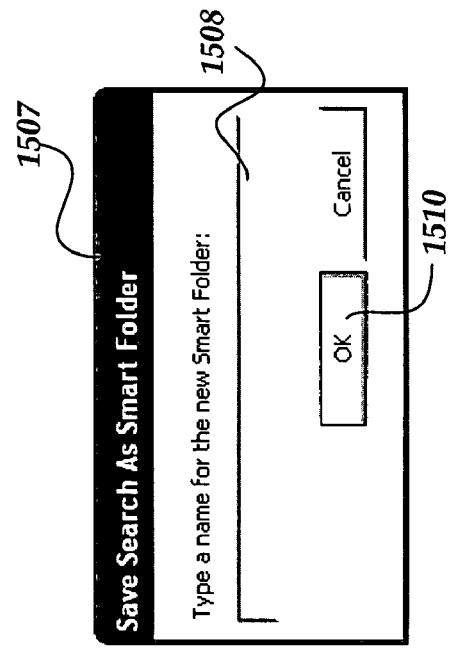

FIGS. 15A-15B are computer screen displays showing illustrative user interfaces for creating search folders from 'Find' and/or 'Advanced Find' search results according to an embodiment of the present invention. Another way of creating a search folder is for a user to conduct a search using a 'Find' or 'Advanced Find' functionality and then save the search as a persisting search in the form of a search folder. Menu functions are made available from both the 'Find' strip 1500, shown in FIG. 15A, and the 'Advanced Find' menu (not shown). A 'Save Search as Search Folder' menu function 1502, when selected, will render the user interface 1507 shown in FIG. 15B. The user will type a name in the 'Name' box 1508 to enable the 'OK' Button 1510. When the user clicks the 'OK' button 1510, a persisting and continuously updating search folder is created with the search criteria set by the user in the 'Find' or 'Advanced Find' search. The default data store folders are applied to this new search folder until changed.

Figure 16:
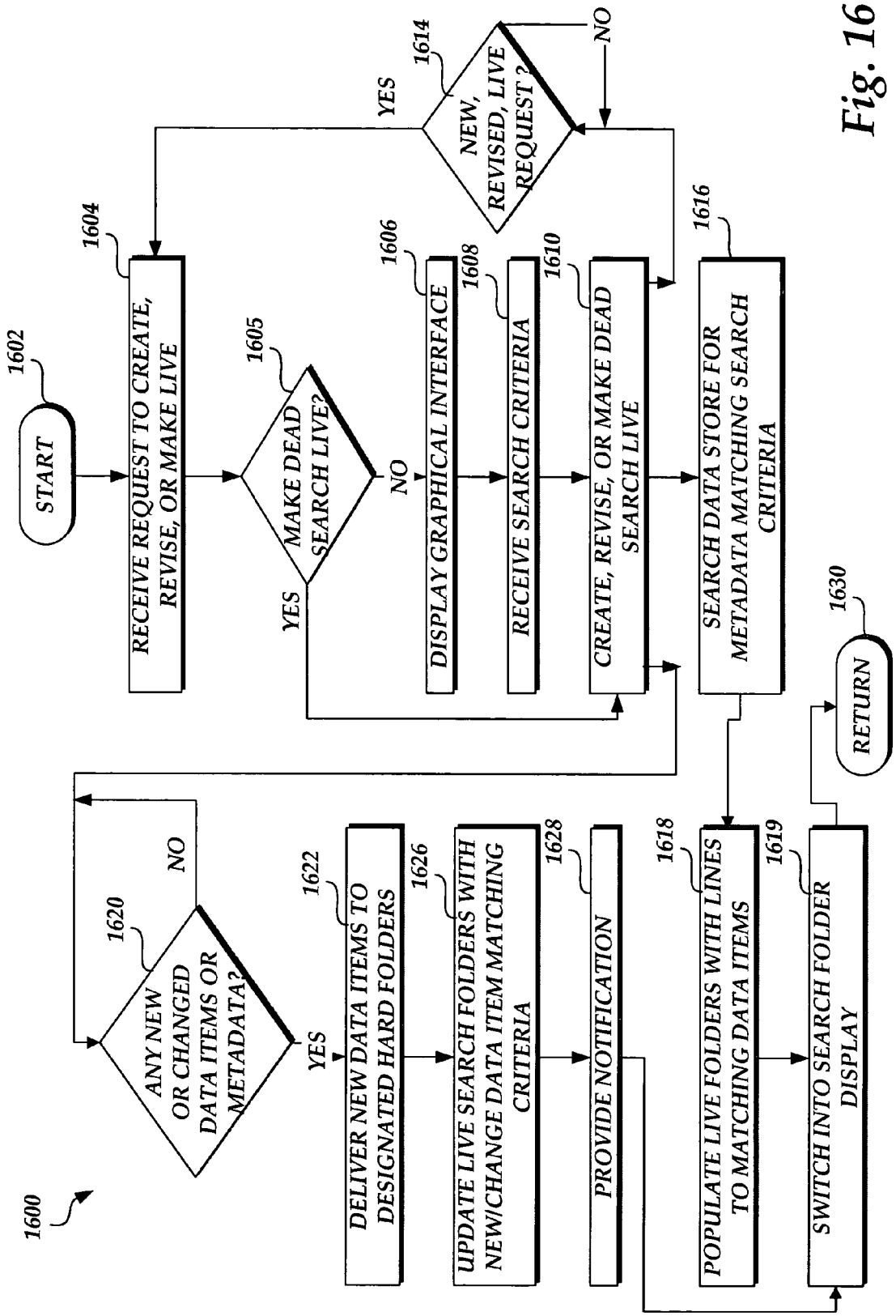
FIG. 16 is an operational flow diagram illustrating a routine for creating and updating search folders according to an embodiment of the present invention.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 16 is an operational flow diagram illustrating a routine for creating and updating search folders according to an embodiment of the present invention. The routine 1600 begins at start operation 1602 and proceeds to operation 1604 where a request to create, revise, or make live a search folder is received. For example, a user of an electronic messaging application may select File/New/Search Folder, may click on a dead search folder, or may right click on an existing search folder to revise the search folder as described in FIG. 13. The routine 1600 then continues to operation 1605 where a determination is made a to whether a dead search folder is being made live. If a dead search folder is being made live, the routine 1600 continues from operation 1605 to operation 1610 described below. If at operation 1605, a dead search folder is not being made live, the routine 1600 continues to operation 1606.

At operation 1606 a template graphical interface 500 or 600 is displayed to the user. The template graphical interface presents ready-made and custom queries of search criteria to the user for selection. The routine 1600 then continues to operation 1608 where a selection of search criteria is received via the graphical interface. Once a selection of search criteria is received, the routine 1600 continues to operation 1610 where the selection of search criteria is applied to a search filter to create, revise, or make live a search folder.

Next, the routine 1600 asynchronously continues to operations 1620, 1616, and 1614. At operation 1616, search filters are used to search a data store for data items, such as emails, that have metadata matching the selection of search criteria for the live search folder. The routine 1600 then proceeds to operation 1618.

At operation 1618, search folders that have been made live are populated with links to data items matching the query of search criteria applied to the search folder's search filter. Links to the same data item may exist concurrently in more than one search folder when the data item matches the search criteria for the multiple search folders. For example, an email that is marked as unread and marked as important will have a link stored in the 'unread mail' search folder and the 'important mail' search folder. Next, the routine 1600 continues to operation 1619 where the folder tree display 300 is displayed and updated to reflect new, revised, or live search folder changes. The routine 1600 then returns control to other operations at return operation 1630.

At operation 1620 the routine 1600 detects whether any new data items or data items having change metadata have been added to the data store. If there are no new or changed data items the routine 1600 branches back to operation 1620. When new or changed data items are added to the data store, the routine 1600 continues to operation 1622. In the case of email data items, operation 1622 delivers new emails to an inbox or designated hard folder of the user. The routine 1600 then proceeds to operation 1624.

At operation 1626, new or changed-data items are evaluated and used to update live search folders by storing links to new or changed data items that match the query of search criteria for the live search folder. It should also be appreciated that at operation 1626, links to changed data items that no longer match the query of search criteria for a search folder are removed from the search folder. For example, an email that was delivered more than a week ago will have changed metadata and will be automatically removed from the 'mail received this week' search folder upon becoming more than one week old. Next the routine 1600 continues to operation 1628.

At operation 1628, notification of a new or changed data item link being added or removed from a search folder is given. Notification may be in the form of an animated search folder icon, an incrementing or decrementing count of total or unread links contained in the folder, or a sound that notifies a user of delivery. The routine 1600 then continues to operation 1619 described above.

At operation 1614, a determination is made as to whether a request to create a new search folder, revise an existing search folder, or make live a dead search folder has been made. Request may be made in the forms described above with regard to operation 1604. If a request has been made, the routine 1600 returns to operation 1604 described above. If such request has not been made, the routine 1600 loops back to operation 1614.

Thus, the present invention is presently embodied as a method, system, and computer-readable medium encoding a computer program for providing persisting and continuously updating search folders.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing a search folder within at least one computer that continuously identifies data items having metadata matching a query of search criteria comprising:

applying the query of search criteria to a search filter to create the search folder wherein the search folder is represented by a search folder icon and a search folder title displayed in a graphical user interface displayed on the at least one computer;

detecting when the search folder is made live wherein the search folder is initially made live by at least one of the following:

receiving a request to access the search folder wherein the request comprises a user selection of the search folder icon representing the search folder via the graphical user interface;

making the search folder live by default when a user accesses an electronic mail application supporting the search folder;

renaming a search folder currently made live; and creating the search folder;

in response to a search folder being made live, changing on the graphical user interface, a text of the search folder title from italic, representing that the search folder is dead, to non-italic representing that the search folder is live wherein when the search folder is dead the search filter is prevented from being continuously applied to new electronic mail messages and electronic mail messages previously stored having changed metadata;

in response to the search folder being made live, searching at least one data store for data items having metadata matching the query of search criteria, wherein the data items comprise at least one of the following: electronic mail messages, computer program files, electronic task lists, electronic meeting requests, electronic appointments, electronic contacts, and electronic notes;

in response to searching for and finding data items having metadata matching the query of search criteria, displaying each link stored in the search folder on a display of the at least one computer wherein upon selecting a link, a view of a data item matching the query of search criteria populating the search folder is displayed, and populating the search folder with a link to each data item having metadata matching the query of search criteria;

detecting when at least one of any new data items are added to the data store and a change occurs to any metadata of data items previously stored in the data store;

in response to the search folder being made live, continuously applying the search filter to the new data items to identify at least one of the new data items having metadata matching the query of search criteria, data items previously stored and having changed metadata matching the query of search criteria, and data items previously stored and having changed metadata no longer matching the query of search criteria, wherein links to a same data item may coexist in multiple search folders as long as the same data item has metadata matching multiple queries of search criteria for the multiple search folders;

in response to identifying a new data item having metadata matching the query of search criteria, storing a link to said new data item in the search folder;

in response to identifying a data item previously stored and having changed metadata matching the query of search criteria, storing a link to said data item having changed metadata matching in the search folder; and in response to identifying a data item previously stored and having changed metadata no longer matching the query of search criteria, removing a link to said data item having changed metadata no longer matching from the search folder.

2. The method of claim 1, prior to applying the query of search criteria to a search filter, further comprising receiving the query of search criteria wherein the query of search criteria is formulated by the user selecting a template via a graphical user interface listing templates displayed on the at least one computer, each template representing a query of search criteria for a search folder wherein the query of search criteria comprises at least one of a ready-made query of search criteria and a ready-made query of search criteria having specified inputs.

3. The method of claim 2, wherein the user comprises an electronic mail message recipient and the data store comprises at least one electronic mail folder storing electronic mail messages associated with the user and wherein the ready-made query of search criteria comprises a query to identify at least one of the following:

electronic mail messages stored in the data store that are marked as unread;

electronic mail messages stored in the data store that are flagged for follow-up;

electronic mail messages stored in the data store that are at least one of marked as unread and flagged for follow-up;

electronic mail messages stored in the data store that are marked as important;

electronic mail messages received in a current week by the user;

electronic mail messages with attachments and stored in the data store;

electronic mail messages stored in the data store that one of equal a default size of memory and exceed the default size of memory;

electronic mail messages directly sent to the user wherein at least one of the name of the user and the electronic mail address of the user is listed in at least one of a 'To' and a 'CC' field of the electronic mail messages; and electronic mail messages not directly sent to the user wherein at least one of the name of the user and the electronic mail address of the user is not listed in one of a 'To' and a 'CC' field of the electronic mail messages.

4. The method of claim 3, wherein at least one of the following are made live by default:

a search folder containing links to:
electronic mail messages stored in the data store that are marked as unread;
electronic mail messages stored in the data store that are flagged for follow-up; and
electronic mail messages stored in the data store that one of equal a default size of memory and exceed the default size of memory.

5. The method of claim 2, wherein the ready-made query of search criteria having specified inputs comprises a query to identify at least one of the following:

electronic mail messages at least one of received from one or more persons and sent to the persons wherein the specified inputs comprise at least one of names of the persons and electronic mail addresses of the persons whereby the user may view conversations;

electronic mail messages received from one or more persons wherein the specified inputs comprise at least one of names of the persons, electronic mail addresses of the persons, and at least one distribution list;

electronic mail messages sent to one or more persons including the user wherein the specified inputs comprise at least one of names of the persons, electronic mail addresses of the persons, and at least one distribution list;

electronic mail messages stored in the data store that one of equal a size of memory and exceed the size of memory wherein the specified inputs comprise the size of memory;

electronic mail messages received by the user one of on a specific date and before the specific date wherein the specified inputs comprise at least one of the specific date and a specific range of time;

electronic mail messages sent to one or more persons wherein the specified inputs comprise at least one of names of the persons, electronic mail addresses of the persons, and at least one distribution list; and electronic mail messages stored in the data store and containing at least one of specific words and specific phrases wherein the specified inputs comprise at least one of the specific words and the specific phrases.

6. The method of claim 2, wherein the query of search criteria further comprises a custom query having specified inputs to identify electronic mail messages having metadata matching the specified inputs wherein the specified inputs comprise at least one of the following:

one or more specific words contained in the electronic mail messages and a specific field of the electronic mail messages in which the specific words are contained;

at least one of one or more persons and one or more electronic mail addresses sending the electronic mail messages wherein a field position of the user may be specified;

at least one of one or more persons, one or more distribution lists, and one or more electronic mail addresses receiving the electronic mail messages wherein a field position of the user may be specified; and at least one of a time and a date associated with the electronic mail messages.

7. The method of claim 2, wherein when multiple specified inputs are received in the query of search criteria, the multiple specified inputs are queried in one of an 'or' format and an 'and' format.

8. The method of claim 1, wherein the data store is selected by the user via a graphical user interface.

9. The method of claim 1, wherein the computer comprises a client computer and wherein the data store resides within at least one of the client computer, a remote server computer connected to the client computer via a network, and a data store connected to the remote server computer connected to the client computer via the network.

10. The method of claim 9, wherein the search folder roams with a profile of the user when the user logs on to a different client computer.

11. The method of claim 1, further comprising:
in response to storing a link to at least one of said new electronic mail message and said electronic mail message in the search folder, providing notification of a link storage via the graphical user interface wherein the notification includes at least one of incrementing a total number or links contained in the search folder, incrementing a total number of links marked as unread in the search folder, and animating the search folder icon; and
in response to removing a link to said electronic mail message from the search folder, providing notification of a link removal via the graphical user interface wherein the notification includes at least one of decrementing a total number or links contained in the search folder, decrementing a total number of links marked as unread in the search folder, and animating the search folder icon.

12. The method of claim 1, wherein a new electronic mail message having metadata matching the query of search criteria is also delivered to at least one of an inbox and a designated hard folder of the user.

13. The method of claim 1, further comprising conducting a search within the search folder and storing the search as a new search folder such that the new search folder contains links to electronic mail messages having metadata matching the search criteria of at least two queries, wherein the at least two queries are combined in the new search folder whereby at least two views of the data store are presented in the new search folder.

14. The method of claim 1, further comprising:
moving the link to an electronic mail message from the search folder to a new location in the data store;
in response to moving the link, detecting whether the electronic mail message continues to have metadata matching the query of search criteria for the search folder,
in response to the electronic mail message continuing to have metadata matching the query of search criteria, retaining the link to the electronic mail message in the search folder;
in response to receiving a request to change at least one of a name of the search folder or the query of search criteria for the search folder, rendering a user interface to change the search folder, and receiving and storing changes to the search folder;
in response to deleting the link to the electronic mail message from the search folder, deleting the electronic mail message and any links to the electronic mail message from the data store from which the search folder is populated; and
in response to deleting the search folder, deleting the links to electronic mail messages referenced in the search folder but retaining the electronic mail messages referenced in the search folder in the data store.

15. A computer-readable medium having computer executable instructions which, when executed by a computer, cause the computer to perform the method of claim 1.

16. A computer-controlled apparatus capable of performing the method of claim 1.

17. A computer system for providing search folders that dynamically identifies data items having metadata matching a query of search criteria, the system comprising:
a processor coupled to a memory and a data store;
an electronic messaging server application program capable of being executed on the processor and, when executed on the processor, operative to:
apply the query of search criteria to a search filter to create the search folder;
search the data store for data items having metadata matching the query of search criteria, wherein the data items comprise at least one of the following: electronic mail messages, computer program files, electronic task lists, electronic meeting requests, electronic appointments, electronic contacts, and electronic notes;
in response to searching for and finding data items having metadata matching the query of search criteria, display each link stored in the search folder on a display of the at least one computer wherein upon selecting a link, a view of a data item matching the query of search criteria populating the search folder is displayed, and populate the search folder with a link to each data item having metadata matching the query of search criteria;
detect when at least one of any new data items are added to the data store and a change occurs to any metadata of data items previously stored in the data store;
continuously apply the search filter to the new data items to identify at least one of the new data items having metadata matching the query of search criteria, data items previously stored and having changed metadata matching the query of search criteria, and data items previously stored and having changed metadata no longer matching the query of search criteria, wherein links to a same data item may coexist in multiple search folders as long as the same data item has metadata matching multiple queries of search criteria for the multiple search folders;
in response to identifying a new data item having metadata matching the query of search criteria, store a link to said new data item in the search folder;
in response to identifying a data item previously stored and having changed metadata matching the query of search criteria, store a link to said data item in the search folder;
in response to identifying a data item previously stored and having changed metadata no longer matching the query of search criteria, remove a link to said data item from the search folder; and
in response to deleting the link to any data item from the search folder, delete that data item and any links to that data item from the data store from which the search folder is populated.

18. The system of claim 17, further operative to:
transmit a link to the search folder,
in response to receiving a request to access the search folder via the link to the search folder, transmit each link stored in the search folder wherein upon receiving a request via to access a link stored in the search folder, a view of a data item matching the query of search criteria populating the search folder is retrieved and transmitted.

19. The system of claim 18, wherein the data items comprise emails and wherein prior to searching the data store and continuously applying the search filter, the system is further operative to detect when the search folder is made live wherein searching the data store and continuously applying the search filter occur in response to the search folder being made live.

20. The system of claim 19, wherein the search folder is initially made live by at least one of the following:

receiving a request to access the search folder;

making the search folder live by default; and wherein prior to applying the query of search criteria to a search filter, the system is further operative to:

receive the query of search criteria wherein the query of search criteria is formulated by a template, each template representing a query of search criteria for a search folder wherein the query of search criteria comprises at least one of a ready-made query of search criteria and a ready-made query of search criteria having specified inputs.

21. A computer-readable medium which stores a set of instruction which when executed performs a method of providing a search folder within at least one computer that continuously identifies data items having metadata matching a query of search criteria, the method executed by the set of instructions comprising:

applying the query of search criteria to a search filter to create the search folder;

searching at least one data store for data items having metadata matching the query of search criteria, wherein the data items comprise at least one of the following: electronic mail messages, computer program files, electronic task lists, electronic meeting requests, electronic appointments, electronic contacts, and electronic notes;

in response to searching for and finding data items having metadata matching the query of search criteria, displaying each link stored in the search folder on a display of the at least one computer wherein upon selecting a link, a view of a data item matching the query of search criteria populating the search folder is displayed, and populating the search folder with a link to each data item having metadata matching the query of search criteria;

detecting when at least one of any new data items are added to the data store and a change occurs to any metadata of data items previously stored in the data store; and continuously applying the search filter to the new data items to identify at least one of the new data items having metadata matching the query of search criteria, data items previously stored and having changed metadata matching the query of search criteria, and data items previously stored and having changed metadata no longer matching the query of search criteria, wherein links to a same data item may coexist in multiple search folders as long as the same data item has metadata matching multiple queries of search criteria for the multiple search folders;

detecting when the search folder is made live wherein searching the data store and continuously applying the search filter occur in response to the search folder being made live, further comprises;

in response to identifying a new data item having metadata matching the query of search criteria, storing a link to said new data item in the search folder;

in response to identifying a data item previously stored and having changed metadata matching the query of search criteria, storing a link to said data item in the search folder;

in response to identifying a data item previously stored and having changed metadata no longer matching the query of search criteria, removing a link to said data item from the search folder;

wherein the search folder is represented by a search folder icon and a search folder title displayed in a graphical user interface displayed on the at least one computer and wherein the search folder is initially made live by at least one of the following:

receiving a request to access the search folder wherein the request comprises a user selection of the search folder icon representing the search folder via a graphical user interface;

making the search folder live by default when a user accesses an electronic mail application supporting the search folder;

renaming the search folder currently made live; and creating the search folder; and in response to a search folder being made live, changing on the graphical user interface, a text of the search folder title from italic, representing that the search folder is dead, to non-italic representing that the search folder is live wherein when the search folder is dead the search filter is prevented from being continuously applied to new electronic mail messages and electronic mail messages previously stored having changed metadata.

22. The computer-readable medium of claim 21 further comprising receiving a query of search criteria wherein the query of search criteria is formulated by a user selecting a template via a graphical user interface listing templates displayed on the at least one computer, each template representing a query of search criteria for a search folder wherein the query of search criteria comprises at least one of a ready-made query of search criteria and a ready-made query of search criteria having specified inputs.

23. The computer-readable medium of claim 22, wherein the user comprises an electronic mail message recipient and the data store comprises at least one electronic mail folder storing electronic mail messages associated with the user and wherein the ready-made query of search criteria comprises a query to identify at least one of the following:

electronic mail messages stored in the data store that are marked as unread;

electronic mail messages stored in the data store that are flagged for follow-up;

electronic mail messages stored in the data store that are at least one of marked as unread and flagged for follow-up;

electronic mail messages stored in the data store that are marked as important;

electronic mail messages received in a current week by the user;

electronic mail messages with attachments and stored in the data store;

electronic mail messages stored in the data store that one of equal a default size of memory and exceed the default size of memory;

electronic mail messages directly sent to the user wherein at least one of the name of the user and the electronic mail address of the user is listed in at least one of a 'To' and a 'CC' field of the electronic mail messages; and electronic mail messages not directly sent to the user wherein at least one of the name of the user and the electronic mail address of the user is not listed in one of a 'To' and a 'CC' field of the electronic mail messages.

24. The computer-readable medium of claim 22, wherein the ready-made query of search criteria having specified inputs comprises a query to identify at least one of the following:
- electronic mail messages at least one of received from one or more persons and sent to the persons wherein the specified inputs comprise at least one of names of the persons and electronic mail addresses of the persons whereby the user may view conversations;
- electronic mail messages received from one or more persons wherein the specified inputs comprise at least one of names of the persons, electronic mail addresses of the persons, and at least one distribution list;
- electronic mail messages sent to one or more persons including the user wherein the specified inputs comprise at least one of names of the persons, electronic mail addresses of the persons, and at least one distribution list;
- electronic mail messages stored in the data store that one of equal a size of memory and exceed the size of memory wherein the specified inputs comprise the size of memory;
- electronic mail messages received by the user one of on a specific date and before the specific date wherein the specified inputs comprise at least one of the specific date and a specific range of time;
- electronic mail messages sent to one or more persons wherein the specified inputs comprise at least one of names of the persons, electronic mail addresses of the persons, and at least one distribution list; and
- electronic mail messages stored in the data store and containing at least one of specific words and specific phrases wherein the specified inputs comprise at least one of the specific words and the specific phrases.

25. The computer-readable medium of claim 22, wherein the query of search criteria further comprises a custom query having specified inputs to identify electronic mail messages having metadata matching the specified inputs wherein the specified inputs comprise at least one of the following:
- one or more specific words contained in the electronic mail messages and a specific field of the electronic mail messages in which the specific words are contained;
- at least one of one or more persons and one or more electronic mail addresses sending the electronic mail messages wherein a field position of the user may be specified;
- at least one of one or more persons, one or more distribution lists, and one or more electronic mail addresses receiving the electronic mail messages wherein a field position of the user may be specified; and
- at least one of a time and a date associated with the electronic mail messages.

26. The computer-readable medium of claim 22, wherein when multiple specified inputs are received in the query of search criteria, the multiple specified inputs are queried in one of an 'or' format and an 'and' format.

27. The computer-readable medium of claim 21, wherein the data store is selected by the user via a graphical user interface.

28. A method of providing a search folder within at least one computer that continuously identifies data items having metadata matching a query of search criteria comprising:
- applying the query of search criteria to a search filter to create the search folder wherein the search folder is represented by a search folder icon and a search folder title displayed in a graphical user interface displayed on the at least one computer;
- searching at least one data store for data items having metadata matching the query of search criteria, wherein the data items comprise at least one of the following: electronic mail messages, computer program files, electronic task lists, electronic meeting requests, electronic appointments, electronic contacts, and electronic notes;
- in response to searching for and finding data items having metadata matching the query of search criteria, displaying each link stored in the search folder on a display of the at least one computer wherein upon selecting a link, a view of a data item matching the query of search criteria populating the search folder is displayed, and populating the search folder with a link to each data item having metadata matching the query of search criteria whereby links to a same data item may coexist in multiple search folders as long as the same data item has metadata matching multiple queries of search criteria for the multiple search folders;
- detecting when at least one of any new data items are added to the data store and a change occurs to any metadata of data items previously stored in the data store;
- in response to the search folder being made live, continuously applying the search filter to the new data items to identify at least one of the new data items having metadata matching the query of search criteria, data items previously stored and having changed metadata matching the query of search criteria, and data items previously stored and having changed metadata no longer matching the query of search criteria, wherein links to a same data item may coexist in multiple search folders as long as the same data item has metadata matching multiple queries of search criteria for the multiple search folders;
- in response to identifying a new data item having metadata matching the query of search criteria, storing a link to said new data item in the search folder;
- in response to identifying a data item previously stored and having changed metadata matching the query of search criteria, storing a link to said data item having changed metadata matching in the search folder; and
- in response to identifying a data item previously stored and having changed metadata no longer matching the query of search criteria, removing a link to said data item having changed metadata no longer matching from the search folder;
- in response to deleting the link a data item from the search folder, deleting that data item and any links to that data item from the data store from which the search folder is populated.

* * * * *